US012324537B2

(12) United States Patent
Weber et al.

(10) Patent No.: US 12,324,537 B2
(45) Date of Patent: Jun. 10, 2025

(54) BEVERAGE APPLIANCE WITH POD RECOGNITION SYSTEM

(71) Applicant: BEDFORD SYSTEMS LLC, Bedford, MA (US)

(72) Inventors: Nicholas Weber, Brookline, MA (US); James Lynch, Georgetown, MA (US)

(*) Notice: Subject to any disclaimer, the term of this patent is extended or adjusted under 35 U.S.C. 154(b) by 929 days.

(21) Appl. No.: 16/362,370

(22) Filed: Mar. 22, 2019

(65) Prior Publication Data

US 2019/0290054 A1    Sep. 26, 2019

Related U.S. Application Data

(60) Provisional application No. 62/646,737, filed on Mar. 22, 2018.

(51) Int. Cl.
| | |
|---|---|
| A47J 31/44 | (2006.01) |
| A23L 2/52 | (2006.01) |
| A47J 31/40 | (2006.01) |
| B65D 25/20 | (2006.01) |
| B67D 1/08 | (2006.01) |

(52) U.S. Cl.
CPC ............ *A47J 31/4492* (2013.01); *A23L 2/52* (2013.01); *A47J 31/407* (2013.01); *B65D 25/205* (2013.01); *B65D 2203/06* (2013.01); *B67D 2001/0811* (2013.01)

(58) Field of Classification Search
CPC ................................. B25C 1/047; B25C 1/06
See application file for complete search history.

(56) References Cited

U.S. PATENT DOCUMENTS

| 5,091,968 | A | * | 2/1992 | Higgins | ............... | G06V 10/751 |
| | | | | | | 382/137 |
| 5,717,195 | A | * | 2/1998 | Feng | .................... | G06K 7/1093 |
| | | | | | | 235/470 |
| 6,377,713 | B1 | * | 4/2002 | Vuong | .................. | G06T 3/4007 |
| | | | | | | 348/E7.012 |
| 6,565,003 | B1 | * | 5/2003 | Ma | ....................... | G06K 7/1417 |
| | | | | | | 235/462.11 |
| 8,590,753 | B2 | | 11/2013 | Marina et al. | | |
| 9,119,505 | B2 | | 9/2015 | Guard et al. | | |
| 2002/0148356 | A1 | * | 10/2002 | Lazaris | ............... | A47J 31/3638 |
| | | | | | | 99/302 R |

(Continued)

FOREIGN PATENT DOCUMENTS

| CN | 101862119 A | 10/2010 |
| CN | 102711566 A | 10/2012 |

(Continued)

OTHER PUBLICATIONS

DE 102007032287 Espacenet Translation (Year: 2009).*

(Continued)

*Primary Examiner* — Erik Kashnikow
*Assistant Examiner* — Ashley Axtell
(74) *Attorney, Agent, or Firm* — Dorsey & Whitney LLP

(57) ABSTRACT

Described herein is an appliance for making a beverage that can include a pod receiver, a camera oriented to capture an image of a code depicted on the pod, a processor and memory in communication with the processor where the processor includes programmed instructions that cause the processor to analyze a design section of the code.

18 Claims, 21 Drawing Sheets

(56) References Cited

U.S. PATENT DOCUMENTS

| | | | |
|---|---|---|---|
| 2004/0175052 A1* | 9/2004 | Bian | G06K 7/1465 382/254 |
| 2004/0211837 A1* | 10/2004 | Eisenberg | G06K 19/06009 235/462.41 |
| 2006/0091209 A1* | 5/2006 | He | G06K 7/10851 235/385 |
| 2008/0169347 A1* | 7/2008 | Olmstead | G06K 7/14 235/462.41 |
| 2008/0296362 A1 | 12/2008 | Lubow | |
| 2009/0314838 A1* | 12/2009 | Kimura | G06K 7/14 235/494 |
| 2010/0044439 A1* | 2/2010 | Lee | G06K 7/10861 235/462.08 |
| 2010/0059589 A1* | 3/2010 | Goncalves | G07G 1/0054 382/218 |
| 2010/0264219 A1* | 10/2010 | He | G06K 7/10722 235/462.32 |
| 2013/0129876 A1* | 5/2013 | Ye | A47J 31/407 426/232 |
| 2015/0144693 A1* | 5/2015 | Li | G06K 7/10722 235/437 |
| 2016/0131912 A1* | 5/2016 | Border | G02B 27/0075 345/8 |
| 2016/0132707 A1* | 5/2016 | Lindbo | G06K 7/1413 235/462.44 |
| 2018/0354713 A1* | 12/2018 | Ting | B65D 85/8058 |

FOREIGN PATENT DOCUMENTS

| | | | | |
|---|---|---|---|---|
| CN | 103596474 A | 2/2014 | | |
| CN | 103876626 A | 6/2014 | | |
| CN | 105147110 A | 12/2015 | | |
| CN | 105636488 A | 6/2016 | | |
| CN | 105813513 A | 7/2016 | | |
| CN | 107108114 A | 8/2017 | | |
| CN | 107531401 A | 1/2018 | | |
| CN | 107595127 A | 1/2018 | | |
| DE | 102007032287 A1 * | 1/2009 | | A47J 31/369 |
| EP | 1890271 A1 | 2/2008 | | |
| EP | 2811875 A1 | 12/2014 | | |
| EP | 3222176 A1 | 9/2017 | | |
| EP | 3634183 A1 | 4/2020 | | |
| WO | 2014095985 A1 | 6/2014 | | |
| WO | 2017081304 A1 | 5/2017 | | |

OTHER PUBLICATIONS

International Search Report and Written Opinion for International Application No. PCT/US2019/023612 mailed Jul. 4, 2019.
Extended European Search Report for EP Application No. 19771041.1 dated Nov. 22, 2021.

* cited by examiner

BEVERAGE APPLIANCE WITH POD RECOGNITION SYSTEM

CROSS-REFERENCE TO RELATED APPLICATION

This patent application is a non-provisional patent application of, and claims priority to, U.S. Provisional Application No. 62/646,737 filed Mar. 22, 2018, titled "Pod Recognition System," the disclosure of which is hereby incorporated herein by reference in its entirety.

FIELD

The present disclosure relates to systems and methods for analyzing information associated with a beverage pod, and more particularly, to operating a beverage appliance using information from the beverage pod.

BACKGROUND

Single-serving beverage systems can be used to brew coffee, chocolate, tea, soda, other carbonated beverages, and many other types of drinks. Generally, the beverage system can include a dispenser that dispenses the beverage into a cup for the user to drink. The ingredients to the beverage can be received from a pod that packages the ingredients for a single drink. The pod can be received by the appliance and punctured to gain access to the pod's ingredients. The beverage system can then mix the ingredients with water and dispenses the mixed beverage into the user's cup.

One type of beverage machine is disclosed in U.S. Pat. No. 9,119,505, issued to Brent Guard, et al. In this reference, a coffee brewing apparatus includes a corresponding coffee brewer as well as a sensor that is configured and arranged to sense food components as used by that means for brewing coffee beverages. This coffee brewing apparatus then further includes an external network interface configured and arranged to facilitate interfacing with a remote resource (or resources). An end user interface and a processor are also disclosed that are is operably coupled to the sensor, the external network interface, and the end user interface and that is configured and arranged to independently use information regarding food components as are used by the means for brewing coffee beverages to facilitate obtaining corresponding responsive information from the remote resource and to then present that information to an end user via the end user interface.

Another brewing machine is disclosed in U.S. Pat. No. 8,590,753 to Carlos Heman Marina. This reference discloses a beverage dispensing system including a container, an attachment mechanism, and a cartridge. The container can hold a mixing solution or liquid, such as water, to be mixed with the contents of the cartridge. The attachment mechanism is generally located within the container. The attachment mechanism includes an engagement assembly, a piercing portion, and a valve assembly. The container can include a capture device that reads a unique identifier. The memory chip or scanning device can then store the information for future upload. Each of these references can be incorporated by reference for all that they teach.

SUMMARY

In an embodiment, an appliance for making a beverage can include a pod receiver, a camera oriented to capture an image of a code depicted on the pod, a processor and memory in communication with the processor, where the processor includes programmed instructions that cause the processor to analyze a barcode section of the code and analyze a design section of the code.

In another embodiment, the programmed instructions can cause the processor to analyze a date section of the code. Analyzing at least one of the barcode section and the design section can involve storing bits of information about the code without storing an entire image of the code in the memory, or storing a reduced resolution image in memory. The barcode section can be an interleaved 2 of 5 barcode. In some cases, the barcode section can be a binary type barcode with black spaces representing "1" and white spaces representing "0".

In another embodiment, the programmed instructions can cause the processor to authenticate at least a portion of the code. Authenticating can include identifying color transitions. Authenticating can further include measuring a distance between at least two of the color transitions. Authenticating can further include comparing to a master template.

In another embodiment, the barcode section can include a plurality of black bars separated with a plurality of white gaps, wherein both the black bars and the white gaps provide data involved in decoding the code. Analyzing the design section can include identifying greyscale transition points in each row of pixels.

In another embodiment, the camera can be a 640×480 pixel camera capable of operating at up to 30 frames per second. The pod can include a beverage medium and the code includes information on using the beverage medium.

In another embodiment, a method of using an appliance for making a beverage can include using a camera to capture data of a code on a pod when the pod is secured within a pod receiver of the appliance, analyzing a barcode section of the code, and analyzing a design section of the code.

In another embodiment, the method can include analyzing a date section of the code. Analyzing at least one of the barcode section and the design section can involve storing bits of information about the code without storing an entire image of the code in the memory, or storing a reduced resolution image in memory. Analyzing the design section can include authenticating the code.

In another embodiment, authenticating can include identifying color transitions in the design section. Authenticating can include measuring a distance between at least two of the color transitions. The method can include determining an identity of the pod based on analyzing at least one of the barcode section and the design section.

In another embodiment, an appliance for making a beverage includes a pod receiver, a camera oriented to capture an image of a code depicted on the pod, a processor and memory in communication with the processor, where the processor includes programmed instructions that cause the processor to analyze a barcode section of the code, analyze a date section of the code, analyze a design section of the code, identify the pod based on the analysis of the barcode section, and authenticate the pod based on the analysis of the design section. Analyzing at least one of the barcode section, the date section, and the design section can include storing bits of information about the code without storing an entire image of the code in the memory.

In addition to the exemplary aspects and embodiments described above, further aspects and embodiments will become apparent by reference to the drawings and by study of the following description.

BRIEF DESCRIPTION OF THE DRAWINGS

FIG. 7 depicts an example of identifying a character in accordance with aspects of the present disclosure.

FIG. 8 depicts an example of modifying a character in accordance with aspects of the present disclosure.

Figure 1A:
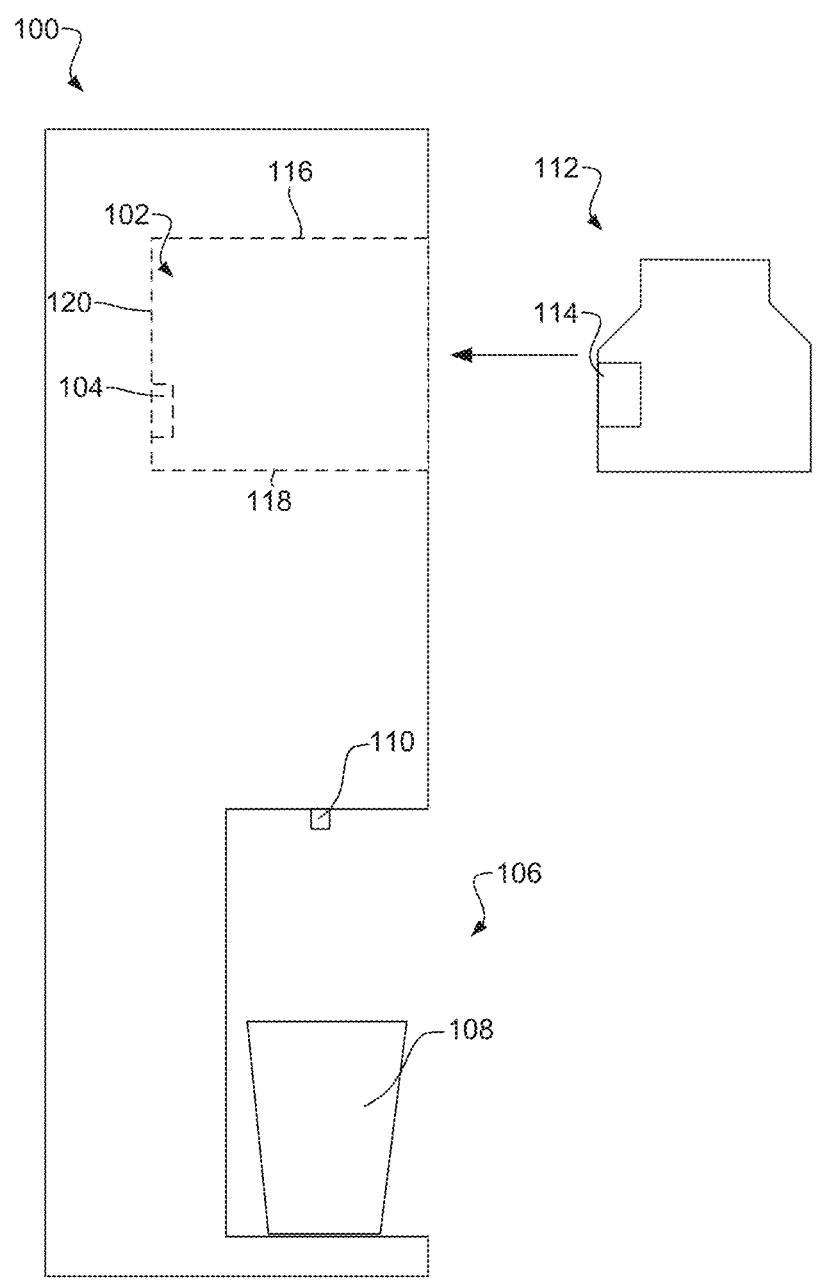
FIG. 1A depicts an example of an appliance in accordance with aspects of the present disclosure.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. Often, the width of an object is transverse the object's length.

For the purposes of this disclosure, the term barcode can generally refer to an optical, machine-readable, representation of data. The barcode can represent data by varying the widths and spacing of parallel lines (i.e. bars). In some cases, a barcode can represent data using rectangles, dots, hexagons and other geometric patterns in two dimensions. Additionally, for the purposes of this disclosure, the term "interleaved 2 of 5 barcode" can generally refer to a specific type of barcode. For example, the interleaved 2 of 5 barcode can generally refer to a continuous two-width barcode symbology that encodes numerical digits. The interleaved 2 of 5 barcode can encodes pairs of digits where the first digit is encoded in the five bars (i.e. the black lines), while the second digit is encoded in the five spaces (i.e. the white gaps between the black lines). In some cases, the digits are encoded by pairs (i.e. the black lines and white gaps); thus, only an even number of digits are encoded. In some cases, an odd number of digits can be encoded by adding a "0" as a first digit, but sometimes an odd number of digits is encoded by using five narrow spaces in the last digit. In some cases, a checksum is included in one of the digits, such as the last digit, to ensure that barcode is correct. In alternative examples, a binary type barcode can be used. The phrase "binary type barcode" can generally refer to a barcode with black spaces representing either a '1' or a '0' and the white spaces representing the other. For example, black spaces can represent a '1' and white spaces representing '0', or vice versa.

In this disclosure, the term "color" can generally refer to any color and/or wavelength in the visual portion of the electromagnetic spectrum or combinations thereof. For example, multiple colors combined can form black. For the purposes of this disclosure, white, black, and any shade of grey are considered colors.

For the purposes of this disclosure, the term "design" can refer to a trademark, pictograph, word, sign, visual representation of an object, symbol, icon, picture, another representation, or combinations thereof. Also, the term "beverage medium" can refer to any appropriate material used in making a beverage, such as a powdered drink mix, liquid syrup, concentrated syrups, ground coffee or liquid coffee extract, tea leaves, dry herbal tea, powdered beverage concentrate, dried fruit extract or powder, natural and/or artificial flavors or colors, acids, aromas, viscosity modifiers, clouding agents, antioxidants, powdered or liquid concentrated bouillon or other soup, powdered or liquid medicinal materials (such as powdered vitamins, minerals, bioactive ingredients, drugs or other pharmaceuticals, nutraceuticals, etc.), powdered or liquid milk or other creamers, sweeteners, thickeners, other appropriate materials, alcoholic beverages or concentrates, spirits concentrates, or combinations thereof.

An appliance can be used to prepare beverages. In some examples, the appliance is a brewing machine that prepares beverages like coffee, tea, hot chocolate, cider, and the like. In other examples, the appliance is machine used to mix the ingredients for carbonated drinks, fruit drinks, milk products, alcoholic drinks, other types of drinks, or combinations thereof.

FIG. 1A depicts an example of an appliance 100 that is used to make beverages. The appliance 100 can include a pod receiver 102, a camera 104 incorporated into the pod receiver 102, a dispensing area 106 that is capable of holding a cup 108, and a nozzle 110 that can dispense a beverage into the cup 108.

In this example, the appliance 100 includes a pod receiver 102 that holds a pod 112 that contains a beverage medium.

The beverage medium can include ingredients used to make a certain type of beverage. A code 114 can be affixed to the outside of the pod 112. The code 114 can include an identifier of the pod 112. In some cases, the code 114 can also include instructions on how to prepare the beverage medium to make a beverage. In some cases, the code 114 includes information that is associated with a database. A processor can use information extracted from the code 114 to reference the database to obtain instructions on how to prepare a beverage with the beverage medium.

The pod 112 can be placed into the pod receiver 102 when the user desires to prepare a beverage. The camera 104 can be incorporated into the pod receiver 102. The camera 104 can be incorporated into a ceiling 116 of the pod receiver 102, into the floor 118 of the pod receiver 102, or into a wall 120 of the pod receiver 102. In some cases, the camera 104 is incorporated into the pod receiver 102 in another way. In some cases, the camera 104 is not incorporated into the structure of the pod receiver 102, but is incorporated into another portion of the appliance 100. In yet another example, the camera 104 is associated with the appliance 100 through a hardwired or wireless link, but is not embodied in the structure of the appliance 100.

In some examples, the pod 112 can only be fitted into the pod receiver 102 in one way. This causes the pod 112 to always be oriented the same way. With the pod 112 consistently oriented in the same way, the camera 104 can be positioned to view the same portion of the pod 112. The pod 112 can include a code 114 that is a fixed to that portion of the pod 112 that is consistently facing the camera 104.

Based on the instructions from the pod 112, the appliance can make a beverage when instructed by the user. In some cases, the user instructs the pod 112 on when to begin making the beverage. In other examples, the appliance 100 can sense when a cup 108 is positioned in the dispensing area 106 and when a pod 112 is loaded into the pod receiver 102 and automatically prepare the beverage without instructions from the user.

Based on the information from the code 114, the appliance 100 can determine the type of drink to be prepared. In an example where the pod 112 includes a syrup for making a soda, the appliance 100 can cause cold water and carbonation to be mixed with the beverage medium to make the soda. In another example where the pod 112 includes hot chocolate, the appliance 100 can cause hot water to be mixed with the beverage medium to make the hot chocolate. The appliance 100 can use the beverage medium in any appropriate manner to prepare the beverage.

Any appropriate type of camera can be used. In some examples, the camera is a low fidelity camera that is less expensive than conventional scanners used to read barcodes. The lower fidelity can lower the cost of the camera rendering the entire cost of the appliance to be lower overall. To lower costs, the processor of the appliance that is in communication with the camera can have less memory than conventional appliances used to mix beverage. In some cases to keep costs down, the memory can be insufficient to store the entire image of the code affixed to the pod. In such examples, the code affixed to the outside of the pod can contain information in a configuration that takes up a minimal amount of memory and involves a low amount of processing while still containing a sufficient amount of information that can be used by the appliance to make the beverage.

In some examples, the camera can be a GC0309 CMOS camera that can be purchased from Galaxycore Microelectronics, Inc. with a place of business at Zhangjiang Hi-Tech Park, Pudong, Shanghai midsummer Road, 11th Floor, No. 560 2 and can be viewed at www.gcoreinc.com. This camera can be integrated with a PIC32 microcontroller to create a low cost image recognition system. In this example, the image recognition system can read the barcode in the code, read a date in the code, and determine the authenticity of the design in the code in approximately 800 milliseconds. The camera can be a 640×480 pixel camera capable of operating at up to 30 frames per second using a 24 megahertz (MHz) clock in a video graphics array (VGA) mode. The camera settings to control the output of the camera can be fully adjustable through an inter-integrated circuit connection to the microcontroller. In some examples, the camera can have 2.5 micrometer by 2.5 micrometer pixel size and be adjustable up to 30 frames per second. The camera can also include an 8 bit parallel interface and run at 2.472 megahertz. In some cases, the camera has a chief ray angle of 27 degrees, but any appropriate type of chief ray angle can be used in accordance with the principles described herein.

In some cases, a camera module includes the camera, the lens, and the printed circuit board that controls the camera. The camera module can be configured to produce a 23.6333 by 17.725 millimeters image when the lens is 30.6 millimeters away from the code. A socket connector can be located at the bottom of the printed circuit board. The camera can be connected to the printed circuit board assembly with a 24 pin 0.4 pitch socket connector. The connector can provide mechanical alignment and rigidity. A 20 pin flex connector can connect the camera printed circuit board assembly to a main printed circuit board. While the above description describes specific features of the printed circuit board and its associated connectors, any appropriate type of printed circuit board and associated connectors can be used in accordance with the principles described herein.

The speed of the camera output is set by the master clock (MCLK) pin. The MCLK pin is controlled by a pulse width modulation (PWM) signal from the microcontroller. In some cases, the max MCLK rate the camera can operate at is 24 MHz. In some cases, the MCLK rate can be set at 1.739 MHz, which can allow a full image of the code to be decoded in approximately 800 ms.

In some examples, the capture time is restricted by how quickly an image can be processed. The gating process can include a pixel processing time. In some cases, each pixel can take 366.6 nanoseconds to process. In such an example, a full image capture time can be 378.6 microseconds. In some cases with a rolling shutter, the full image capture time can be between 300 microseconds and 800 microseconds.

The data output can clocked by a vertical sync indicator (VSYNC) a horizontal sync indicator (HSYNC), and a pixel clock indicator (PCLK). VSYNC can signal the start of an image capture and remain high for the entirety of the image. HSYNC can signal the start of a row capture and remain high for the entirety of the row. PCLK can signal the pixel output data. When PCLK is high, the pixel data can be readable.

In some examples, greyscale output is used. In other examples, any other appropriate color scale can be used. Greyscale can capture purely black, grey, and white. In some of these examples, black can have a value of 0, and white can have a value of 255.

To ensure that the barcode and the design are inside the camera's field of view, the camera's image window can be made as wide as possible to expand the tolerances. In some cases, the window size is 22.44 by 16.83 millimeters. In some situations, barcode failure can occur when the barcode and/or design is less than 48 percent of the window.

Figure 1B:
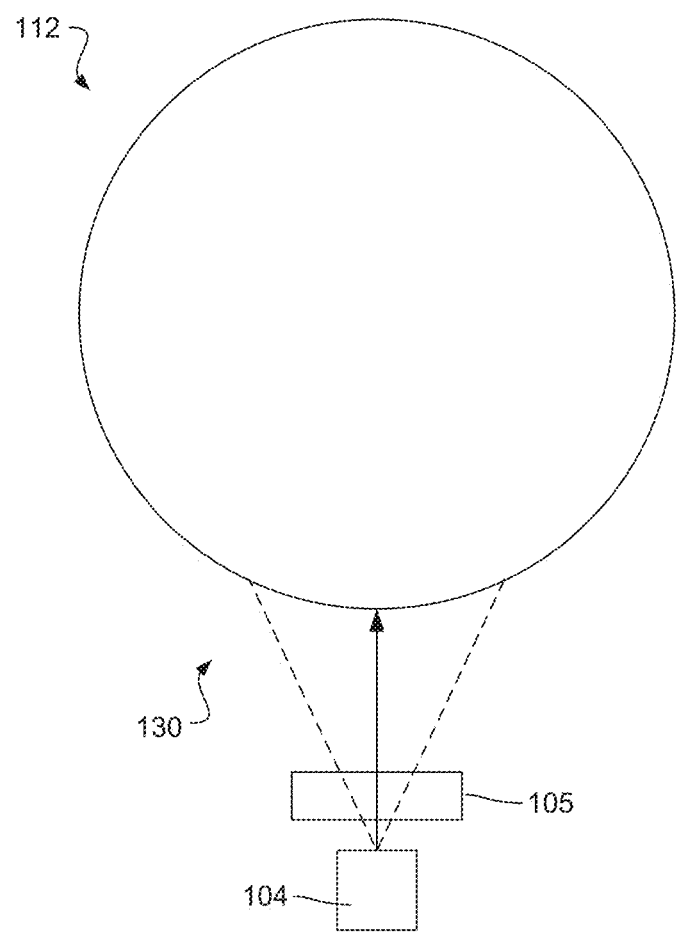
FIG. 1B depicts an example of a camera in relation of to a pod in accordance with aspects of the present disclosure.

FIG. 1B depicts an example of a camera 104 incorporated into the pod receiver 102 depicted in FIG. 1A, and a pod 112 positioned adjacent to the camera 104. In this example, the pod 112 can be oriented so that the code 114 that is affixed to the side of the pod 112 is within the camera's field of view 130. In some examples, the pod 112 can only fit into the pod receiver within a specific orientation, and that orientation causes the code 114 to be within the camera's field of view 130. Additionally, as illustrated in FIG. 1B, a lens 105 can be disposed between the camera 104 and the pod 112 to reduce reflection, refraction, and any other undesirable optical properties that can affect the image received by the camera. The lens 105 can have any number of AR reflective coatings and/or filters formed thereon.

In some cases, the pod receiver 102 includes a puncturing mechanism that is configured to puncture the pod to retrieve the pod's contents for making a beverage. In one particular type of example where the pod receiver 102 is a puncturing mechanism, the user can place the pod 112 in the puncture mechanism so that the barcode is aligned with the camera. In response to the user closing the lid of the puncture mechanism, the camera 104 can take a picture of the barcode. In some cases, the camera has a flash to illuminate the inside of the pod receiver 102 to capture the image. In other examples, a light source can be provided in the appliance and/or the pod receiver 102 to ensure that there is sufficient light for capturing the image. In some examples, no additional light is needed to capture the image of the barcode. The captured barcode can be decoded to determine the identification of the barcode and the authenticity of the design incorporated into the code 114. In some cases, the design is a trademark. The authentication of the design can prevent against counterfeit products that can potentially pose a safety risk to the user.

Figure 2:
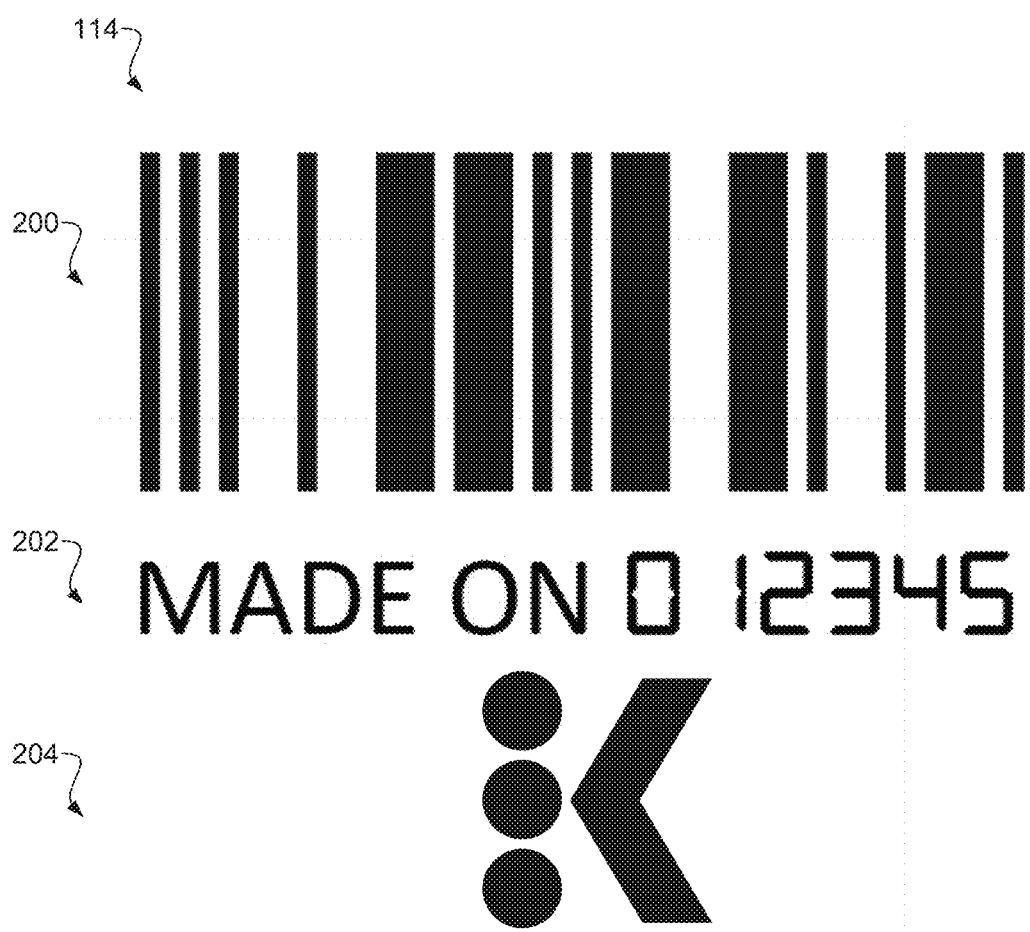
FIG. 2 depicts an example of a code in accordance with aspects of the present disclosure.

FIG. 2 depicts an example of a code 114 that can be affixed to the side of the pod 112. In this example, the code 114 has three distinct sections. The first section is a barcode section 200, the second section is a date section 202, and the third section is a design section 204. These sections can be arranged in any appropriate way. For example, in FIG. 3B, two barcodes can surround a design section, eliminating the date section, or providing the date information via one of the barcodes.

In some cases, the camera functions as an analog sensor that continually sends out pixel data alongside clocking signals. To capture the image, the programmed instructions can use interrupts that trigger on each of the following clocking cycles: VSYNC (column clock), HSYNC (row clock), and PCLK (pixel clock).

In some cases, the image that is affixed to the side of the pod 112 is in a 15×12 millimeter package. However, any appropriate size package can be used. In some cases, the camera 104 is approximately 25 millimeters away from the image when the pod 112 is secured within the pod receiver 102 of the appliance. In other examples, the camera is 34 mm or more away from the image. In other examples, any appropriate distance can be between the pod receiver 102 and the camera's lens. The camera 104 can read the image from the pod 112 and the digital image acquired by the camera can include any combination of the barcode section, the date section, and the design section.

In some examples with the 15×12 millimeter package being 25-35 millimeters away, the camera can be 160×120 pixels. In some cases, the camera 104 can send out data pixel by pixel. The pixels can be sent starting in the top left corner, sending a full row from left to right before moving down to the next row. Alternatively, a full resolution 640×480 pixel camera can be used.

Figure 3A:
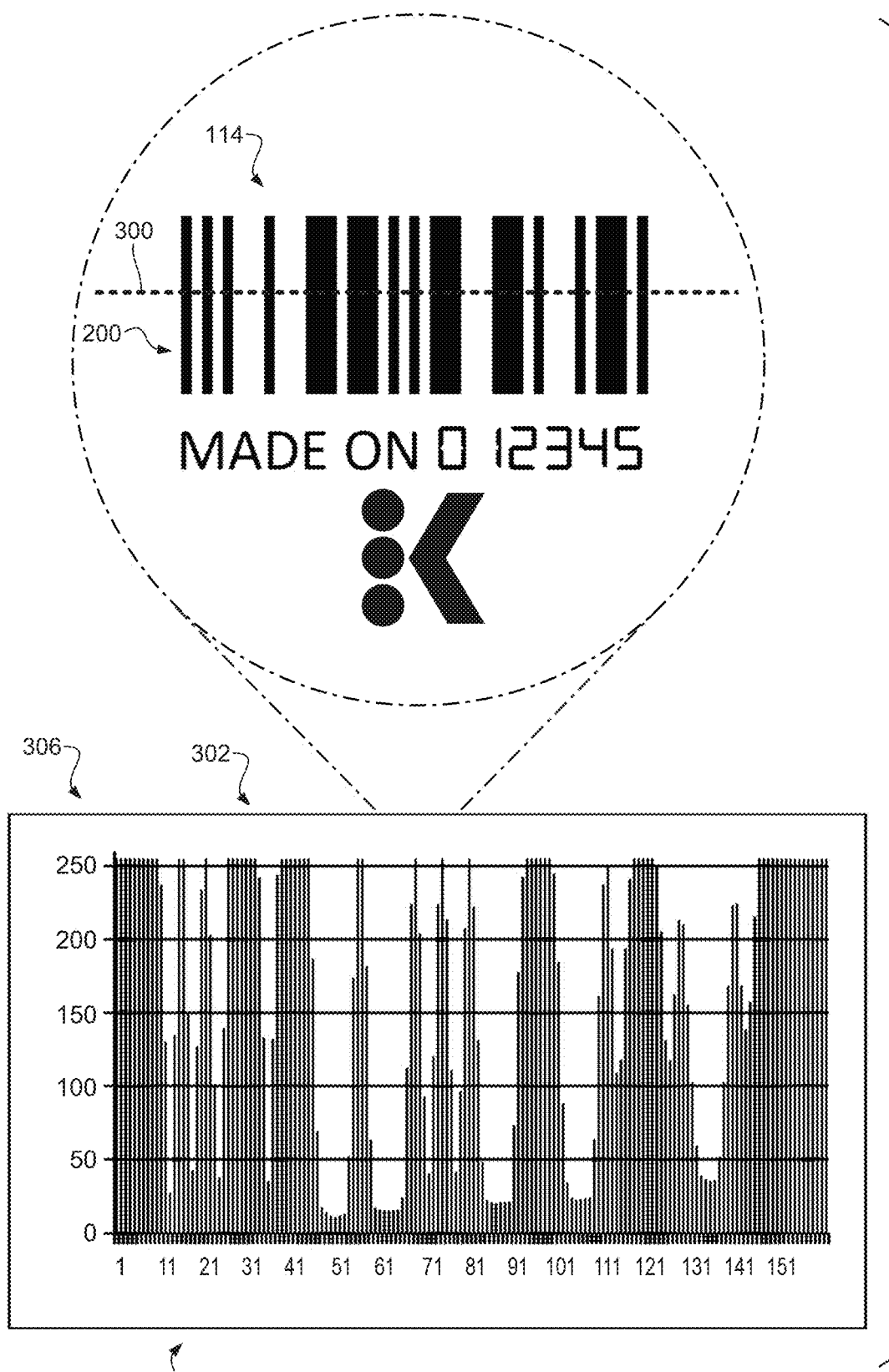
FIG. 3A depicts an example of a barcode analysis in accordance with aspects of the present disclosure.

FIG. 3A depicts an example of reading the barcode section 200 of the code 114. The barcode section 200 can include any appropriate type of barcode. In the depicted example, FIG. 3A depicts a row of the barcode that is being analyzed with dashed line 300, and an array 302 of values associated with the barcode read with the camera 104. In the illustrated example, the horizontal line 304 of the array represents a pixel row, and the vertical line 306 of the array 302 represents a color value.

In some cases, the code 114 includes black bars that are separated with white gaps. In some situations, just the black bars contain information. In other examples, both the black bars and the white gaps between the black bars contain information. In some cases, the barcode can be an interleaved 2 of 5 bar code. In other examples a binary barcode can be used. In the illustrated example, the barcode section can include rows 0-50. The barcode data can be stored in an integer array sized to the width of the image. In those cases involving ¼ subsampling, the array can have 160 elements. As the camera 104 sends out pixel data across the row, the greyscale value of each pixel can be added to the specific column element of the array. After the first 160×50 pixels are sent out by the camera 104, the array contains the sums of the pixel data in each of the 160 columns. After the image capture is completed, each element in the array is divided by the barcode row count where the information can be analyzed. In other examples, a full 640×480 camera resolution can be used to collect pixel data, which is subsequently analyzed.

After the full image is captured, the barcode can be decoded using the data in the array. After the initial values in the array are collected, the values can be averaged based on a total of 50 rows. After the barcode data is averaged, the elements in the array can be either set to 255 for white or 0 for black. This determination can be made based upon whether the averaged element has a value of greater than 150 (White), or less than or equal to 150 (Black). Thus, each pixel in the barcode section 200 can be represented in a binary fashion as either white or black regardless of whether a bar in the barcode is lighter than another bar or a smudge exists in one of the white gaps.

In some examples, the barcode is an interleaved 2 of 5 barcode. In this type of barcode, one digit is encoded into black bars and another digit is encoded into the spaces between the black bars. Since the spaces between the black bars are used to encode another digit, interleaved 2 of 5 barcodes can encode just an even number of digits. In some cases, the application encodes four digits, which allows for 10,000 unique barcodes (0-9,999). For a barcode with four digits, there can be 19 black segments and 17 white gaps. In some cases, two different kinds of bars exist, narrow and wide. A wide bar can include two segments while a narrow bar can have just one segment. Each digit can be encoded in five bars, and the order of the bars can determine the digit. An advantage of the interleaved 2 of 5 barcode is that this code is a standardized barcode that can be read by commercial barcode readers in addition to the camera incorporated into the appliance. In some cases, that many segments per digit can decrease resolution. If greater resolution is desired due to lack of space available for the barcode, then an alternate barcode can be used.

In some examples, a binary type barcode is used. According to one example, the black spaces representing '1' and white spaces representing '0'. Use of a binary type barcode can be used because it exhibits a much higher density when compared to standard barcodes. In the context of barcodes, and as used herein, the term high density refers to the number of unique identifications that can be stored per segment. For example, a standard UPC barcode requires 32 segments per 1000 unique ID's. An interleaved 2 of 5 barcode mentioned above uses 29 segments per 1000 unique ID's. A code 11, 39, and 128 barcode types use 34, 48, and 44 segments per 1000 unique ID's, respectively. In contrast, the use of a binary barcode uses only 12 segments per 1000 unique ID's. This high density provided by the use of a binary barcode allows for high noise immunity.

In some examples, the appliance can decode the information from the barcode data when the barcode is an interleaved 2 of 5 barcode by calculating a color (e.g. greyscale) gradient per pixel, determining white to black and black to white transition locations, determining the criteria for wide and narrow bars, determining bar locations, and calculating the barcode values.

The gradient can be calculated from the averaged barcode data by subtracting the current barcode data by the previous barcode data. After the gradient is calculated, the white to black and black to white transition locations are determined. From the transition locations, the bar lengths are determined by subtracting white to black transitions, locations from black to white transition locations, and vice versa. In the example using interleaved 2 of 5 barcodes, the criteria used to determine if a bar is narrow or wide can be based on the total segments (19 for black, and 17 for white) and a calculated or predetermined width definition.

If a black/white bar distance is greater than the width definition, that bar can be classified as a wide bar. On the other hand, if a black/white bar distance is less than the width definition, that bar can be classified as a narrow bar. With this information, the bar locations can be determined, and the barcode value can be calculated.

Alternatively, use of the binary barcode system simplifies the analysis as each segment can be of the same width, and color (black or white) of each segment is determined, to generate the corresponding binary code.

Figure 3B:
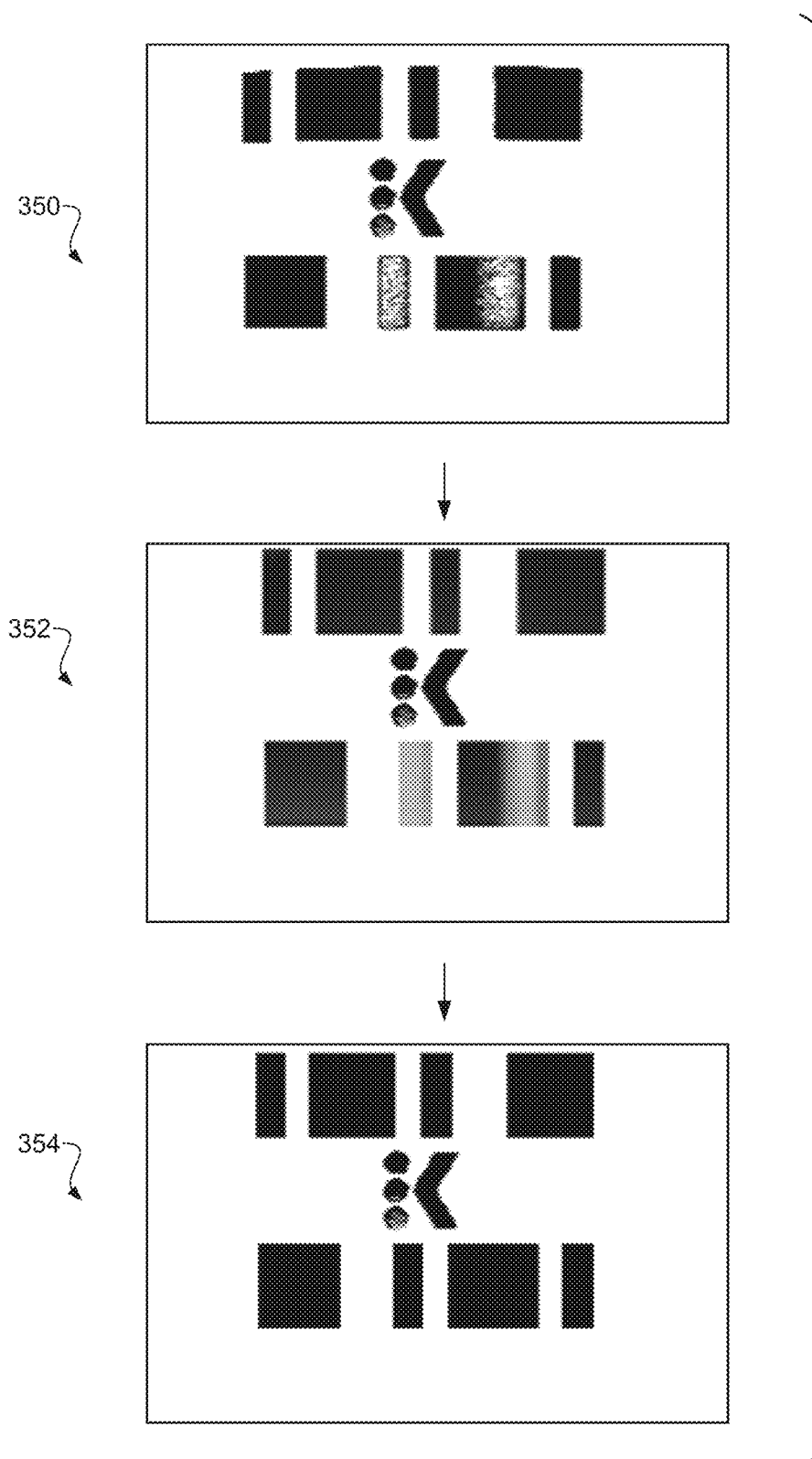
FIG. 3B depicts an example of a barcode analysis in accordance with aspects of the present disclosure.

FIG. 3B depicts images of another example of a barcode and a design, such as that which might appear on the side of a beverage pod. In this example, the code includes a two 10-bit barcodes for a total of 20 bits. This code design is not a conventional barcode. In order to increase the barcode density (information per segment), the code is a binary code. In this example, the binary barcode encodes 1 as black and 0 as white. To decode the barcode, the black-to-white and white-to-black transition locations can be determined and stored. The transition locations can be compared to the entire size of the barcode and the amount of the 1s and 0s calculated.

The original image as represented in image 350 can include raw data that is affected by lighting, parallax, and other visual effects. These visual effects can cause the generally rectangular sections of the barcode to appear angled, non-uniform, asymmetric, to have another visual change, or combinations thereof. Further, these visual effects can cause at least some portions of the barcode to appear lighter than other sections of the barcode.

Image 352 represents the original image after passing through a medium filter. In some examples, a median filter can be a nonlinear digital filtering technique that removes noise from an image. The filter can remove at least some of the visual effects presented in the raw data. The median filter can run through each pixel and replace each pixel with the median of its neighboring pixels. The pixel value of the neighboring pixels can vary pixel to pixel across each row. In some cases, the neighboring pixels used to calculate the median value of the pixel includes just those pixels in the same row as the pixel. In other examples, the neighboring pixels can include those pixels that are included in the rows above and/or below the pixel. In some cases, just those pixels that are immediately adjacent the pixel are used to calculate the pixel value. In other examples, several of the pixels near, but not immediately adjacent to the pixel are used to determine the pixel value. As can be seen in image 352, the color values of the pixels vary across the black barcodes. Each pixel of the black barcode includes a color value that represents where the black barcode is to be.

Image 354 represents the filtered barcode after each pixel has been reassigned a color value based on the filtered pixel value. All pixel values above a certain threshold value are assigned the full white value of 255, and all pixel values below a certain value are assigned the full black value of 0. As can be seen in image 354, there is no variation in color values in the black portions of the barcode or the white portions of the barcode.

Figure 3C:
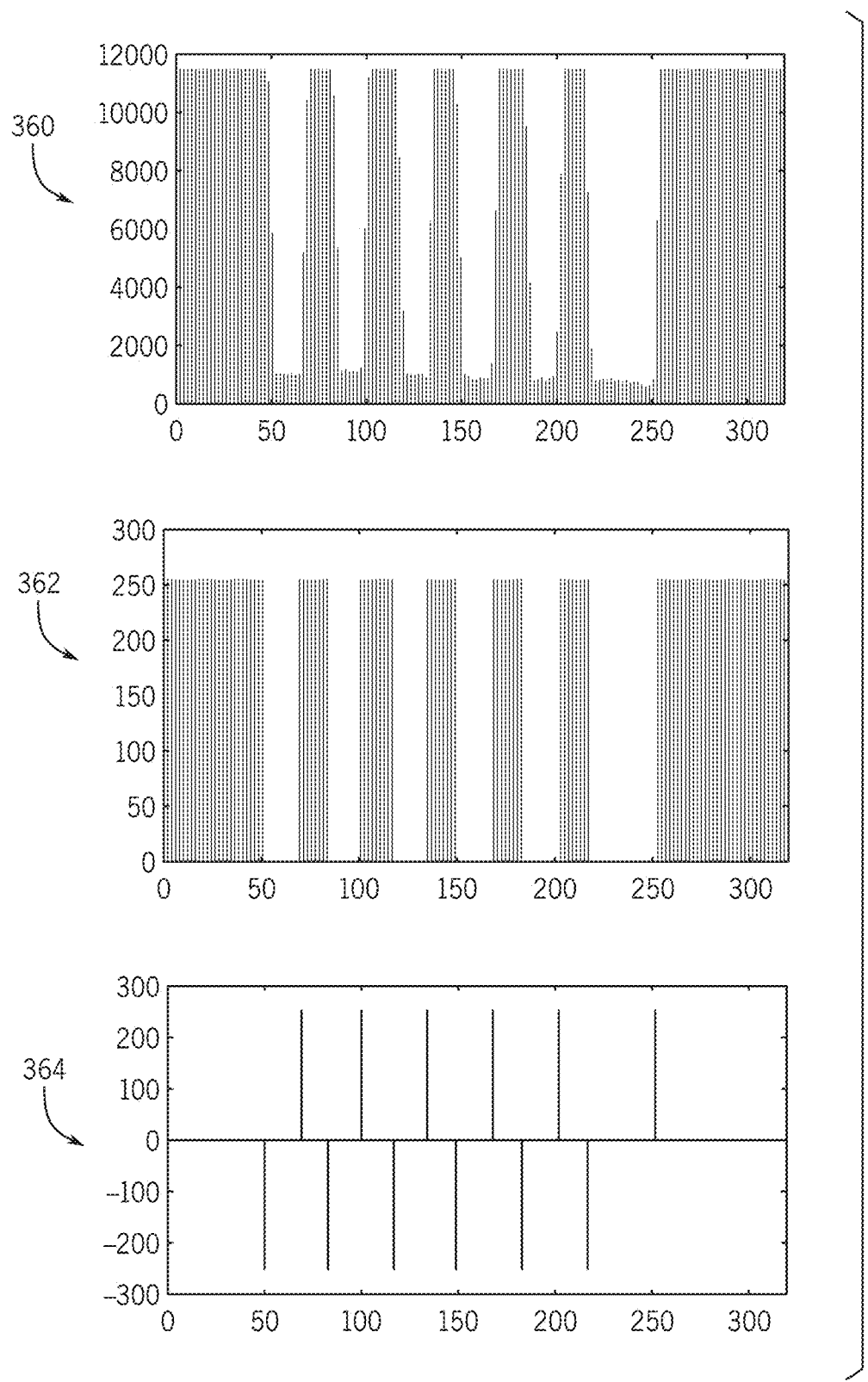
FIG. 3C depicts an example of a barcode analysis in accordance with aspects of the present disclosure.

FIG. 3C depicts another example of a barcode analysis process. In this example, chart 360 represents raw data of a barcode. Chart 362 represents a filtered image with the color values reassigned based on which side of the threshold values the filtered color values are. Chart 364 represents the transitions between the white and black color values. Storing just the transition values rather than all of the values of the barcode saves memory and still allows for a high information density to be associated with the barcode.

Figure 3D:
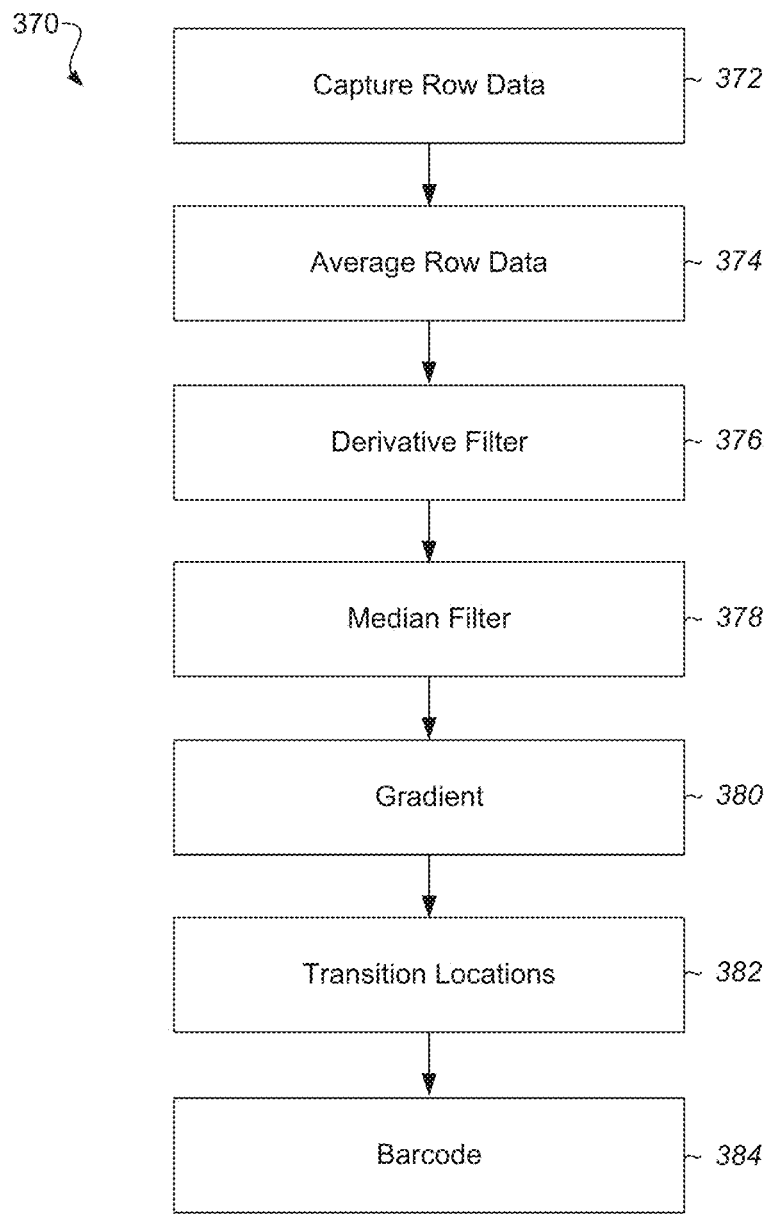
FIG. 3D depicts an example of a barcode analysis in accordance with aspects of the present disclosure.

FIG. 3D depicts an example of an analyzing process 370. In this example, the process 370 can include capturing row data 372, averaging the row data 374, applying a derivative filter 376, applying a median filter 378, applying a gradient 380, identifying transition locations 382, and storing the barcode information 384.

Averaging the row data can be used to reduce at least a portion of the noise in the image. Further, applying the derivative and median filters can also reduce the noise in the images. Applying the gradient can involve reassigning the color values of each pixel.

Figure 4A:
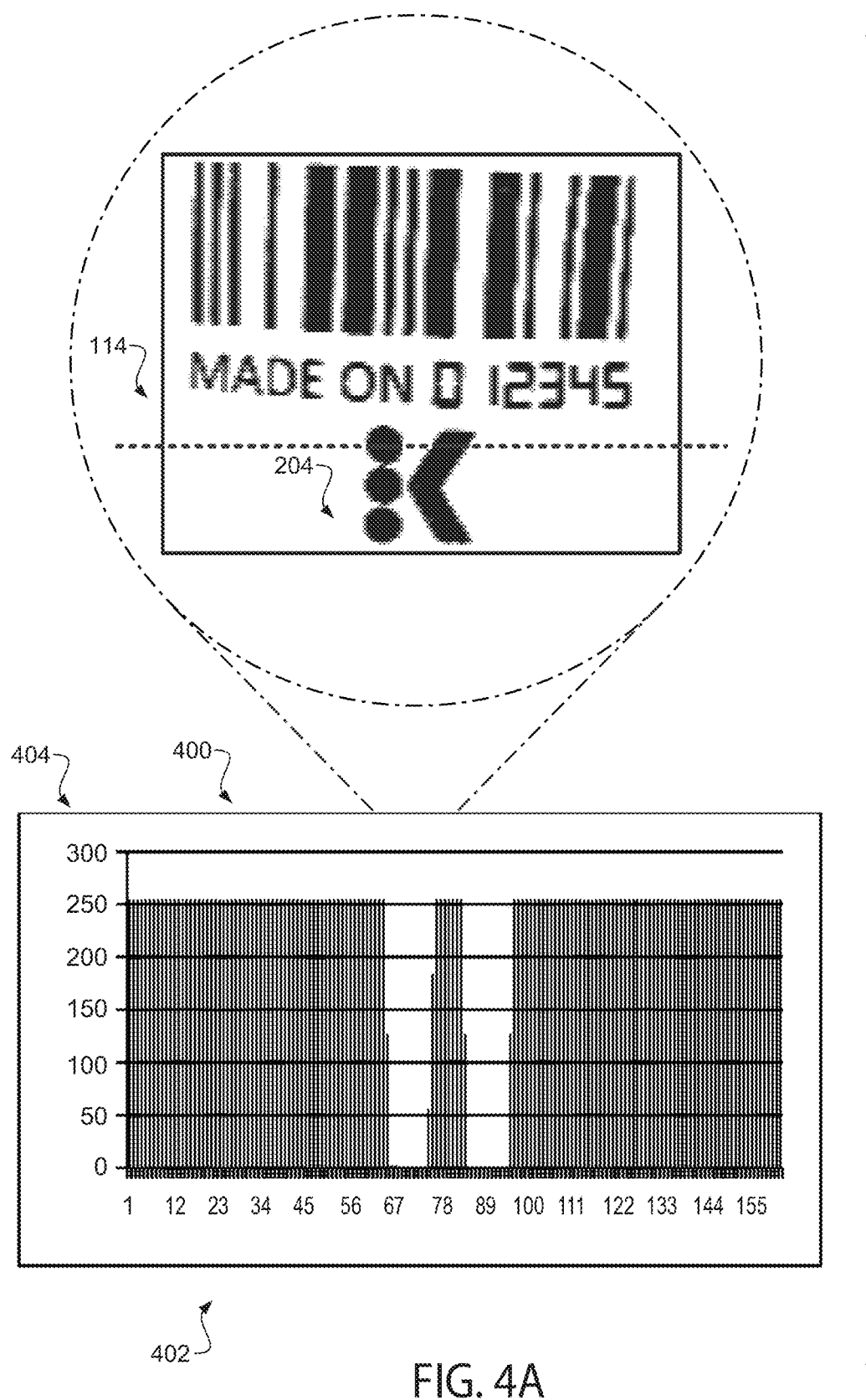
FIG. 4A depicts an example of a design analysis in accordance with aspects of the present disclosure.

FIG. 4 depicts an example of analyzing the design section 204 in the code 114. In FIG. 4, an image of the code 114 is shown, such as that which might appear on the side of the beverage pod or container. In this regard, individual sections of the code 114 can appear irregular, blurry, angled, and so on. The techniques and system herein can compensate for such irregularities, as described herein. For example, in some cases, the design section 204 can be authenticated to ensure that the pod 112 comes from the source that the pod 112 is alleged to come from. This can prevent counterfeited products that pose a risk to users since counterfeited products generally use cheaper ingredients that can be unhealthy, or even poisonous to users. The color values measured by the camera 104 can be depicted as shown in the array 400 in FIG. 4A. In the illustrated example, the horizontal line 402 of the array represents a pixel row, and the vertical line 404 of the array 400 represents a color value.

In some examples, the design includes an image, a trademark, an icon, a pictograph, or another type of image that can be analyzed, measured, and/or tested to determine whether the design includes features that are at calculated or predetermined distances from other features.

Figure 4B:
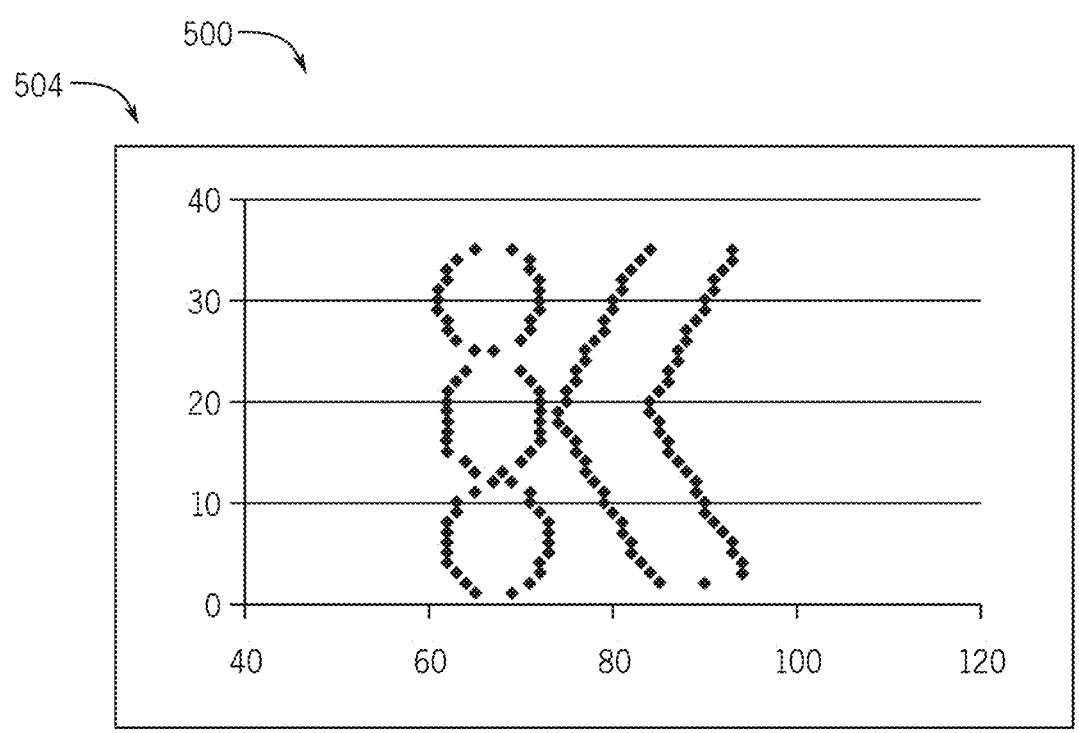
FIG. 4B depicts an example of a schematic representing transition points in accordance with aspects of the present disclosure.

In the example depicted in FIG. 4A, rows 80-120 correspond to the design section 204 and include data about the design. In some cases, to save memory space, the design is partially processed in real time. Instead of storing all 160×40 elements into the array 400, each row from 80-120 can be processed to find transition points. In this particular design, each row can include up to four transition points, and each transition point can be stored into a two dimensional array 500 that is depicted in FIG. 4B. In the array 500 of FIG. 4B, horizontal line 502 represents pixel columns and the vertical line 504 represents pixel rows.

To find the transition locations, each row can be analyzed to determine transition points. The process of decoding a row can include capturing row data, calculating a gradient, averaging the gradient, determining transition locations, and storing the transition locations.

After row data is captured, a gradient can be determined by subtracting the current row from the previous row, and the gradient can then be averaged. Once the gradient is averaged, the transition locations can be determined and stored into the array.

After the image of the design is captured, the design can be authenticated. To authenticate the design, criteria can be established for each unique design. In some cases, the appliance can include several designs that can be associated with a single product. In alternative embodiments, the appliance can include a single design associated with a different brand or with a specific product.

As an illustration, the design in the illustrated example includes a group of three dots, a top line, and a bottom line that generally resemble a "K" when viewed collectively. In this example, the design can be analyzed with any appropriate criteria for authentication. A non-exhaustive list of criteria that can be associated with a circle includes distance from other circles, a width of at least one of the circles, a circle distance from at least one of the lines, a thickness of at least one of the lines, an angle of at least one of the lines, a color of at least one of the lines, a color of at least one of the circles, a length of at least one of the lines, another feature of the circles or lines, or combinations thereof.

According to the embodiments described herein, the circle distance check can analyze the circles to ensure that the diameters of all three of the circles are relatively consistent, at least two of the diameters of the circles are relatively consistent, at least one of the circles is relatively consistent with a predetermined or calculated size, or combinations thereof. The circle distance check can also analyze the images to ensure that a distance between at least some of the circles is also consistent. Checking these criteria can include checking that circle diameters across the center of each circle are within 50% of each other and checking that the distance between the center of each circle is within 50% of each other. In some cases, each of the distances are measured in pixels.

The line distance check can analyze one of the solid lines of the design to ensure that the thickness of the line is consistent throughout that line or consistent with the thickness of the other line. In one example, the passing criterion as determined by empirical testing can require that 80% of the rows with the lines have to be within 30% of the average line-row distance to receive a positive analysis.

The line angle check can analyze the angle of the solid lines of the design to ensure that the angle is correct. The angle calculation can involve a constant for reference, and can use the average of the line-row distance. In some cases, the passing criterion can include that the x coordinates of the start and end of the solid line must be a certain distance away from the x coordinates of the middle of the solid line. In some cases, the exact distance criterion can be that the start and end x coordinates need to have a distance away from the x coordinates of the middle of the line that is greater than 40% of the average of the row distances.

Alternatively, a full resolution 640×480 pixel camera can be used. In this example, after the full resolution image of the design section is received, a reduced resolution image of the design is created and stored to conserve memory. According to one exemplary embodiment, each pixel is saved as only 4 bits, rather than 8 bits, thereby conserving memory.

Figure 5A:
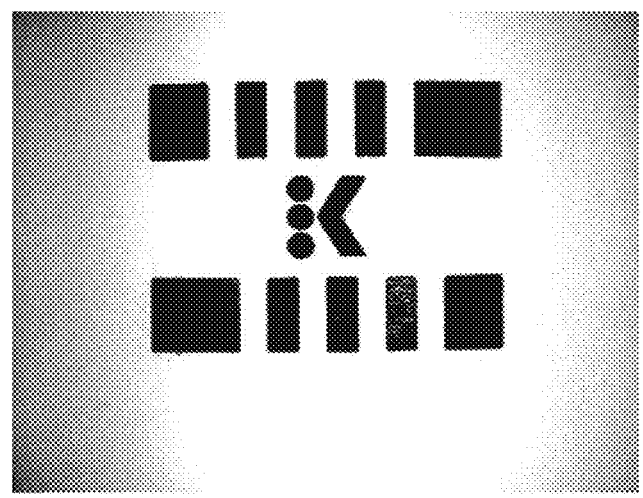
FIGS. 5A-5T illustrate an exemplary method for barcode and image recognition in accordance with aspects of the present disclosure.
Figure 5B:
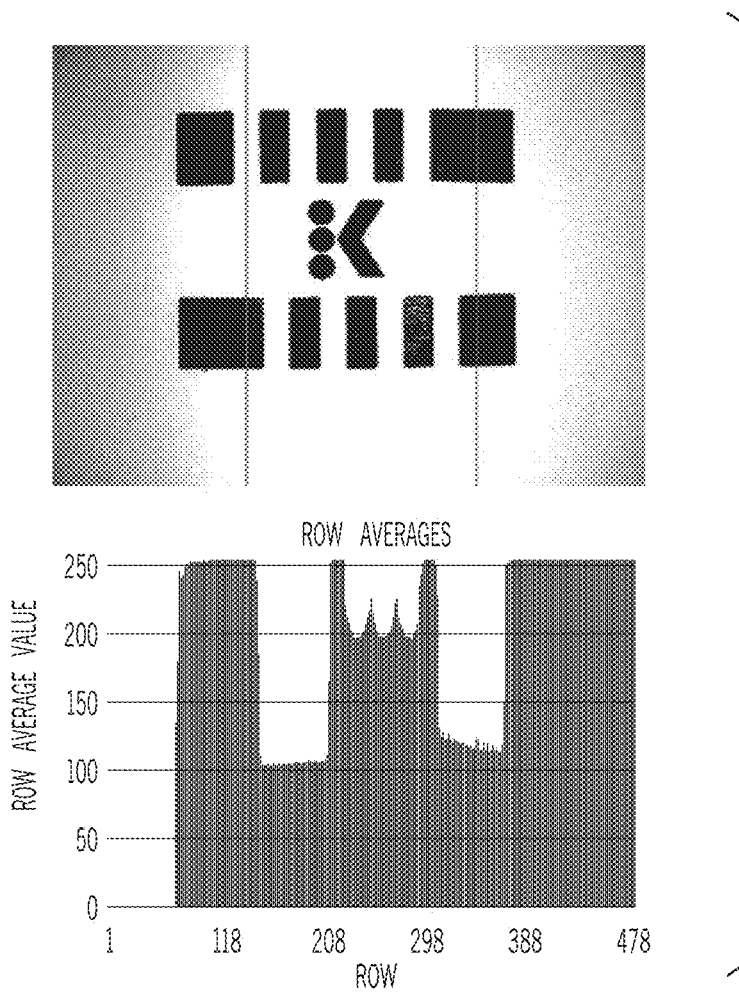
Figure 5C:
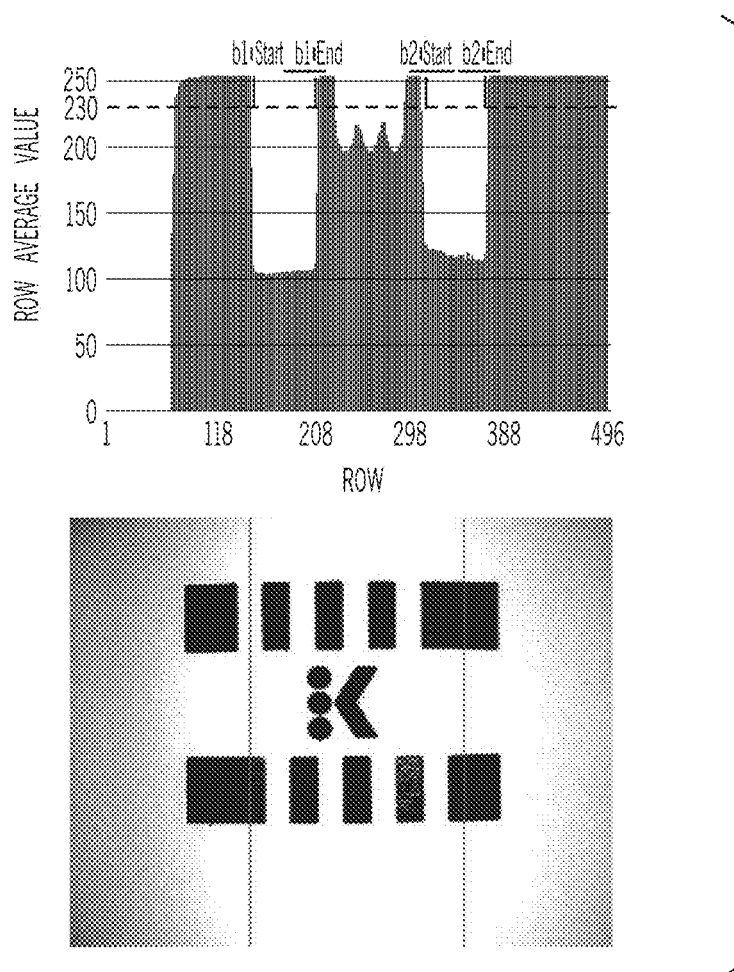
Figure 5D:
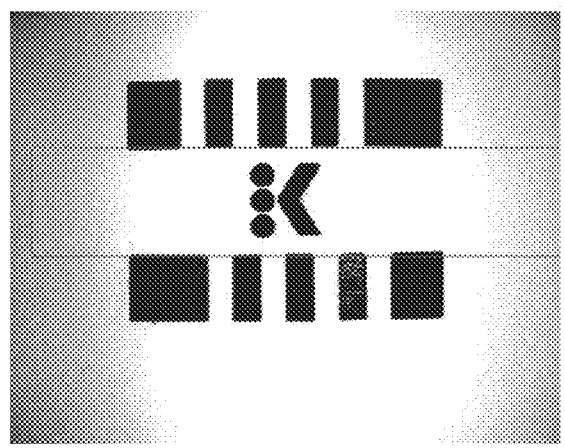
Figure 5E:
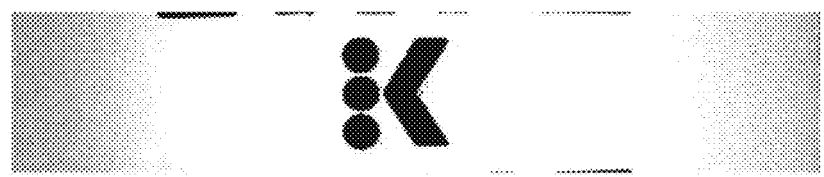
Figure 5F:
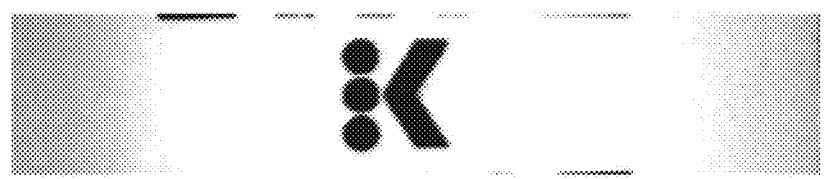
Figure 5G:
Figure 5H:
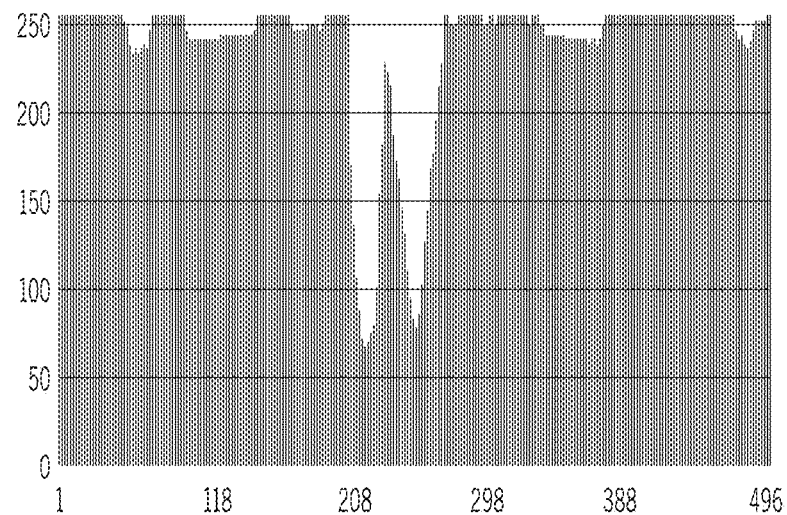
Figure 5I:
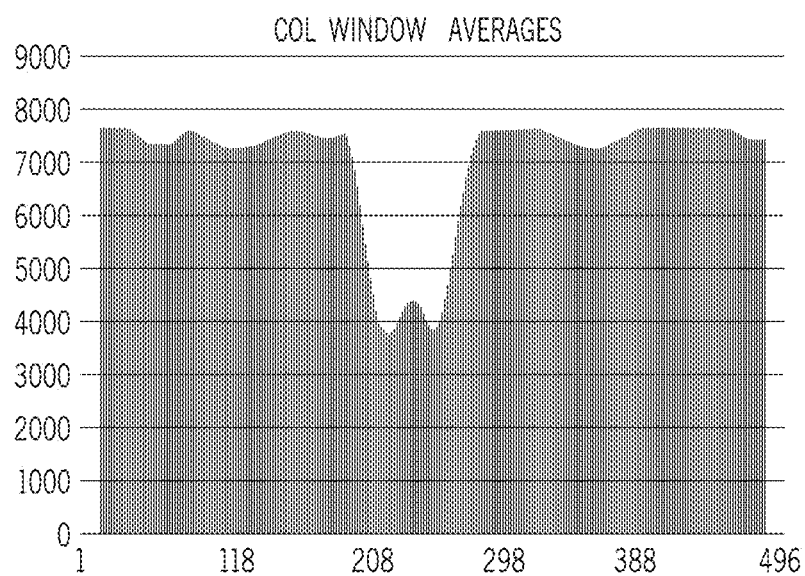
Figure 5J:
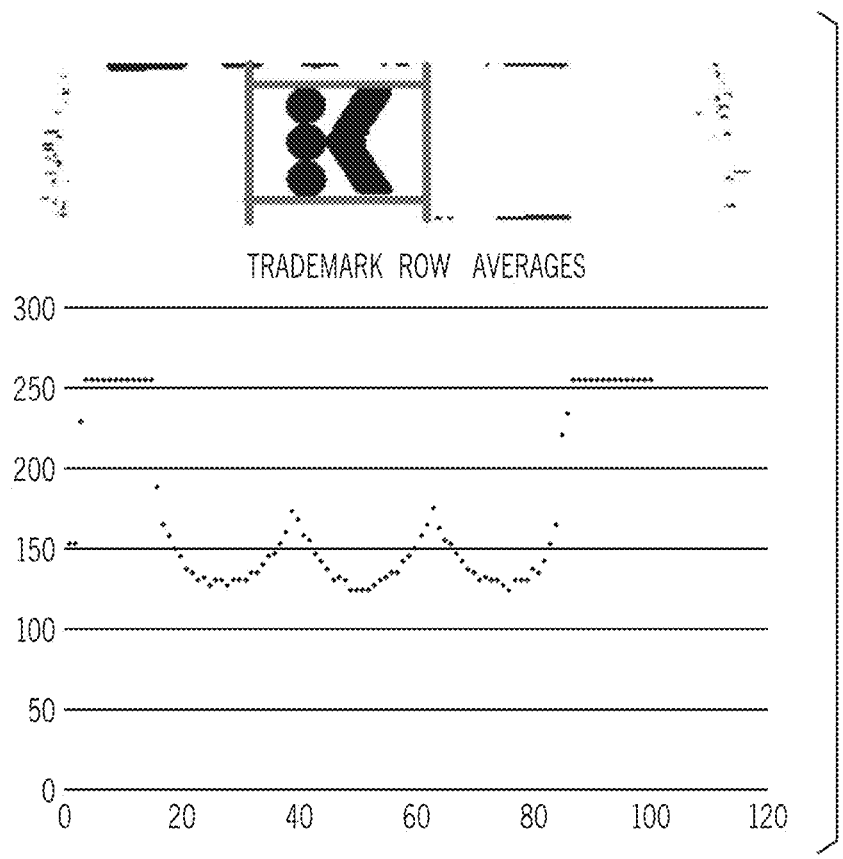
Figure 5K:
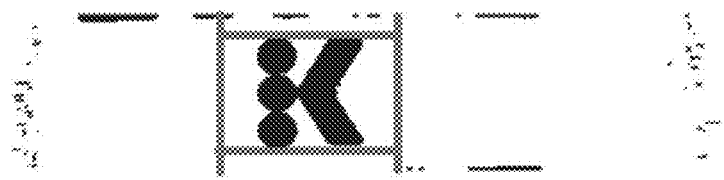
Figure 5L:
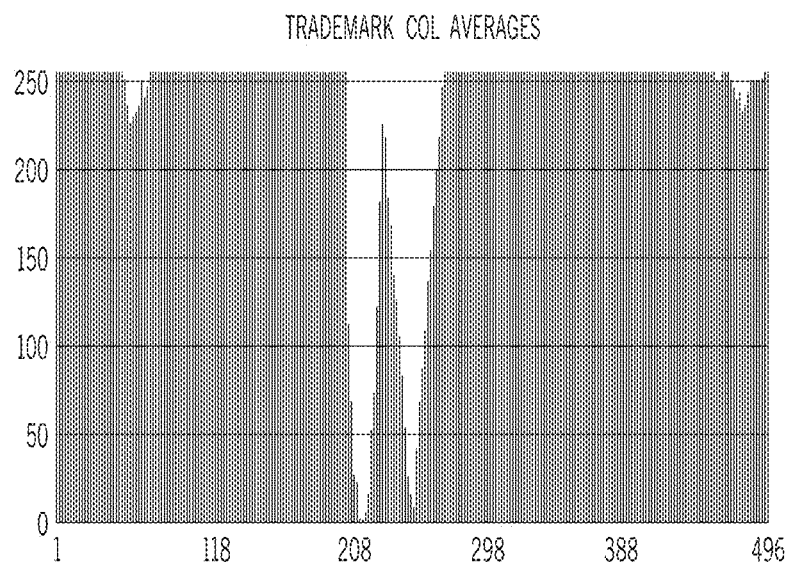
Figure 5M:
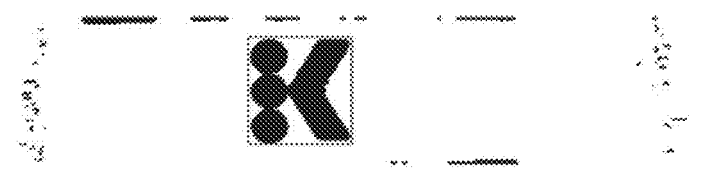
Figure 5N:
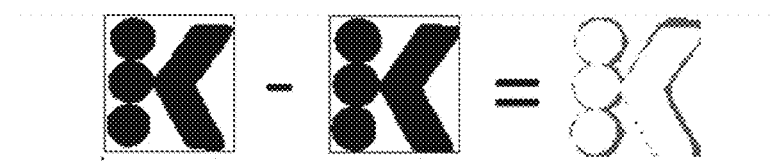
Figure 5O:
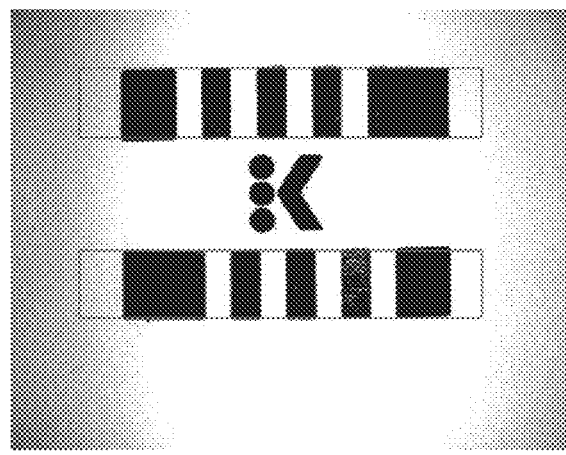
Figure 5P:
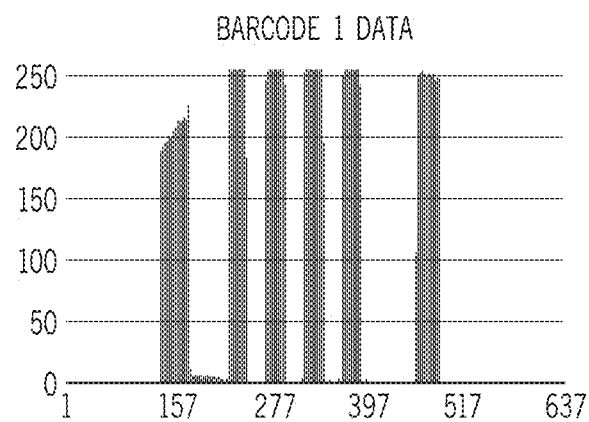
Figure 5Q:
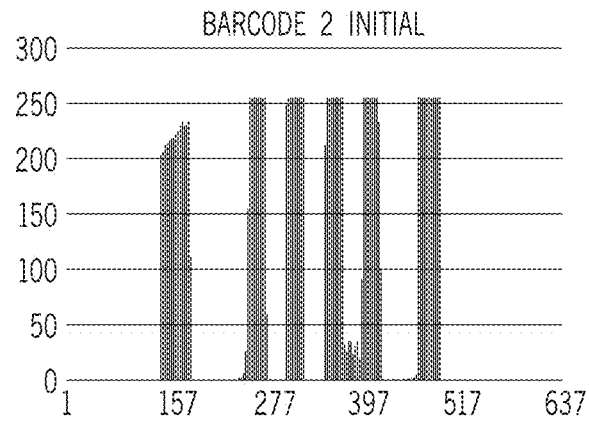
Figure 5R:
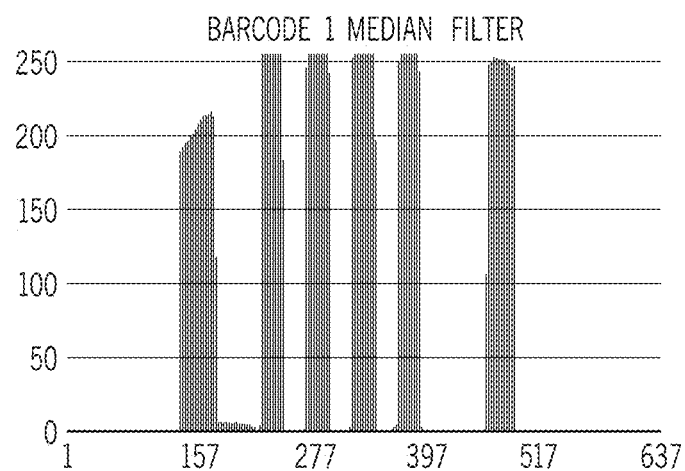
Figure 5S:
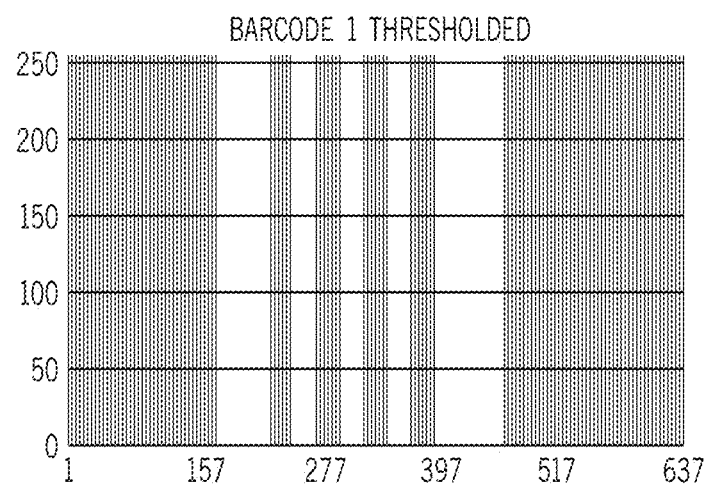
Figure 5T:
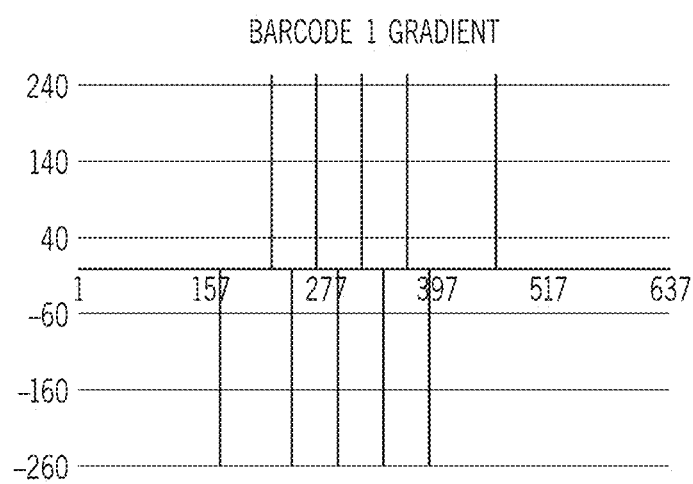

Additionally, the design authentication process illustrated in FIGS. 5A-5T can be used, particularly with a full resolution camera. According to this exemplary method, the image is first captured. This is done in an interrupt service routine. The entire image is saved, but each pixel is downsized to only 4 bits. An example image is shown in FIG. 5A. The start and stop locations of the barcode and design are then determined.

According to one exemplary embodiment, the start and stop locations of the barcode are determined by collecting row averages for column 220 to 420 during the interrupt service routine. They are scaled to be in the range of 0-255. This is illustrated in FIG. 5B. A 7 point median filter is then performed on the row averages to smooth data but maintain edges, as shown in FIG. 5B. This row average signature determines where different areas of the barcode begin and end. The signature allows the algorithm to ignore artwork differences on the pod 112, and focus on the location of the barcode and trademark.

According to one embodiment, all barcode and design images are consistent in size. This allows the system to know where the transition points from white to black should occur. This prior knowledge is then used to determine where the barcode and trademark begin and end.

As shown in FIG. 5C, this can be performed by first, determining the start and stop location of the barcode and trademark. The row average data is used for this determination. Starting at row 0, the following criteria is checked to determine the start and stop locations of the barcode and design. Next, if the current row is above 230 and there is drop greater than 25 between the current row and the row 10 pixels ahead then store the current location as the start of barcode 1. Then, jump forward 30 rows from the start of barcode 1 location. Check if there is a greater than 25 increase within the next 50 rows. Store this location as the end of barcode 1. Next, ensure that 10 rows after the end of barcode 1 the row average is above 230. Then jump forward 130 rows from the end of barcode 1. Check that there is a greater than 25 increase within the previous 55 rows. Store this location as the start of barcode 2. Next, check that 10 rows before the start of barcode 2 the row average is above 230. The system can then jump forward 30 rows from the start of barcode 2 location. Check if there is a greater than 25 increase within the next 50 rows. Store this location as the end of barcode 2. Then, ensure that 15 rows after the end of barcode 2 the row average is above 230. If all the above criteria pass, the start and stop location of each barcode is stored for later use.

A design analysis can then be run to determine design authenticity and design start column location. From the process above, the system knows the end of barcode 1 and start of barcode 2. Isolate that area as the design height and use columns 70 to 570 for the width, as illustrated in FIG. 5D. That leaves us with the image of FIG. 5E for the design. A 3×3 box filtered Gaussian average can be taken to remove noise in the image, as shown in FIG. 5F. The system then thresholds pixels to black or white and removes black from left and right edges, as shown in FIG. 5G. Pixels greater than 210 are white, pixels lower than 210 are black.

Column averages of the filtered window design are then collected, as shown in FIG. 5H. Then, using a 30 column rolling window, the sum of the window is calculated. A window sum drop of 1000 over the course of 10 columns will determine the start of the design. Save this design start location, as shown in FIG. 5I. Then, using the design start location, a window is taken around the design and the row averages calculated, as shown in FIG. 5J.

As shown in FIG. 5K, the system determines the start and stop row of the design by determining when the design row averages are above 245. This determines the design start row and the design end row. The system then rescans the column averages within the smaller design window, as shown in FIG. 5L, and uses the column averages to determine the exact start and stop location of the design. Threshold for start and stop is 250, shown in FIG. 5M.

The system can then compare the extracted design to the master template and determine authenticity, as shown in FIG. 5N. The master template is stored on the processor for comparison. The design authentication process includes resizing the captured design to match the size of the master template, and then comparing the resized captured design to the master template. The comparison can follow the following rules: 1) For a white pixel in the design where an expected black pixel is in the average design, deduct penalty of 1. 2) For a black pixel in the design where an expected white pixel is in the average design, deduct penalty of 10. 3) If the penalty is above a set threshold, the design is determined to not be authentic.

Next, the barcode arrays are filled with the data from the image. The design decoding step is important to barcode decoding because if the system knows the start location of the design and the size of the barcode in relation to the design, it can determine the start location of the barcode.

At this point in the decoding process the system knows the start and stop rows of both barcodes as well at the start location of the design. Using the design start column as a starting point, the system can jump left 150 pixels and designate that as the start column of the barcode. It can also jump right 210 pixels from the design start col and designate that as the end column of the barcode. This creates windows around both barcodes shown in FIG. 5O. The column averages can then be taken of the isolated barcodes and scale on a 0-255 scale. The barcode averages for barcode 1 and 2 are shown in FIGS. 5P and 5Q.

Next, the barcodes can be decoded. According to this example, barcode 1 from above will be used as an example, as shown in FIG. 5R. First, a 7 point median filter is performed on the barcode array. As shown in FIG. 5S, each barcode value is set with either white (255) or black (0) based upon the median filter output. 1) Col 0-180: Threshold 100. 2) Col 180-250: Increasing linear threshold from 100 to 225. 3) Col 250-390: Threshold 225. 4) Col 390-460: Decreasing linear threshold from 225 to 100. 5) Col 460-640: Threshold 100.

Then, the system calculates the gradient of the barcode output from the previous step, as shown in FIG. 5T. Specifically, the system calculates the locations of each peak, calculates the distances between the peaks in order to obtain gap distances, and calculates ID by comparing each gap distance to the sum of all gap distances.

Figure 6:
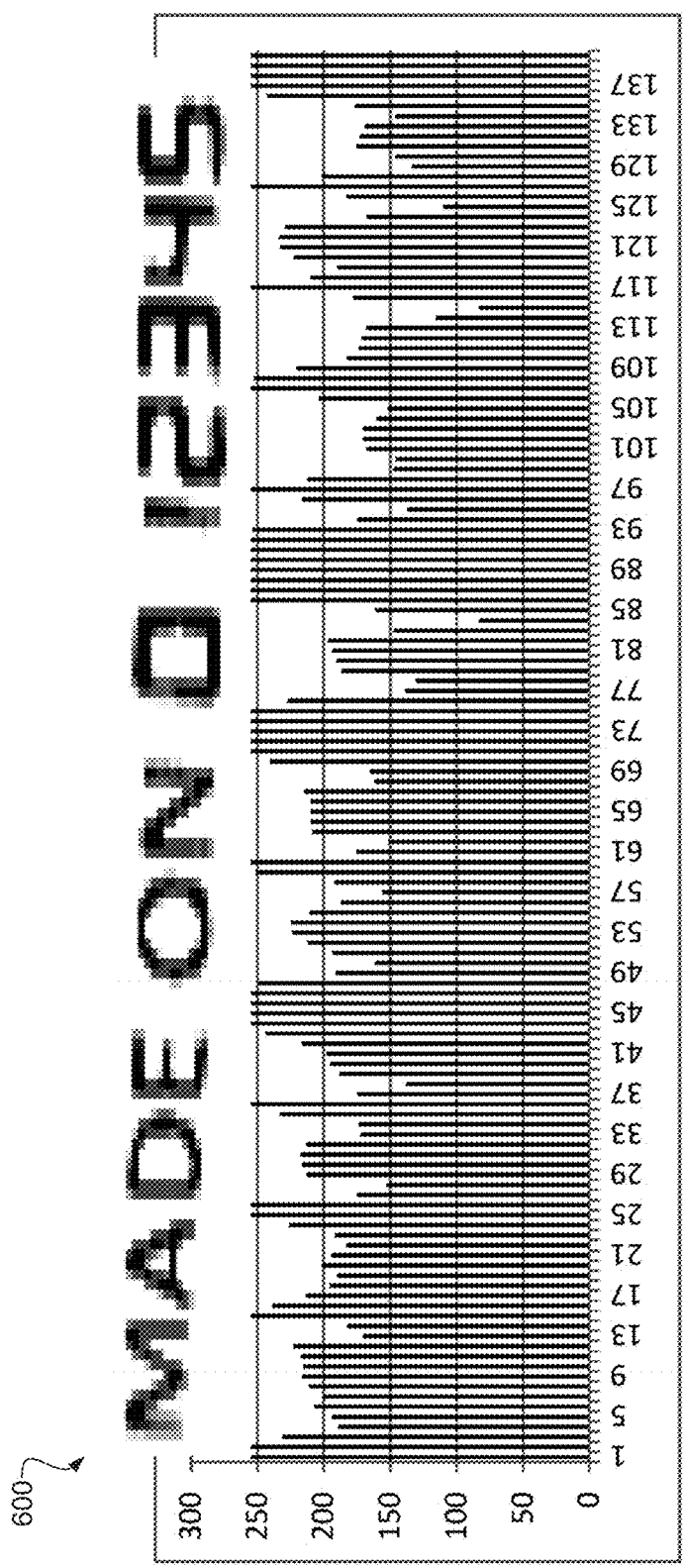
FIG. 6 depicts an example of a date analysis in accordance with aspects of the present disclosure.
Figures 7, 8:
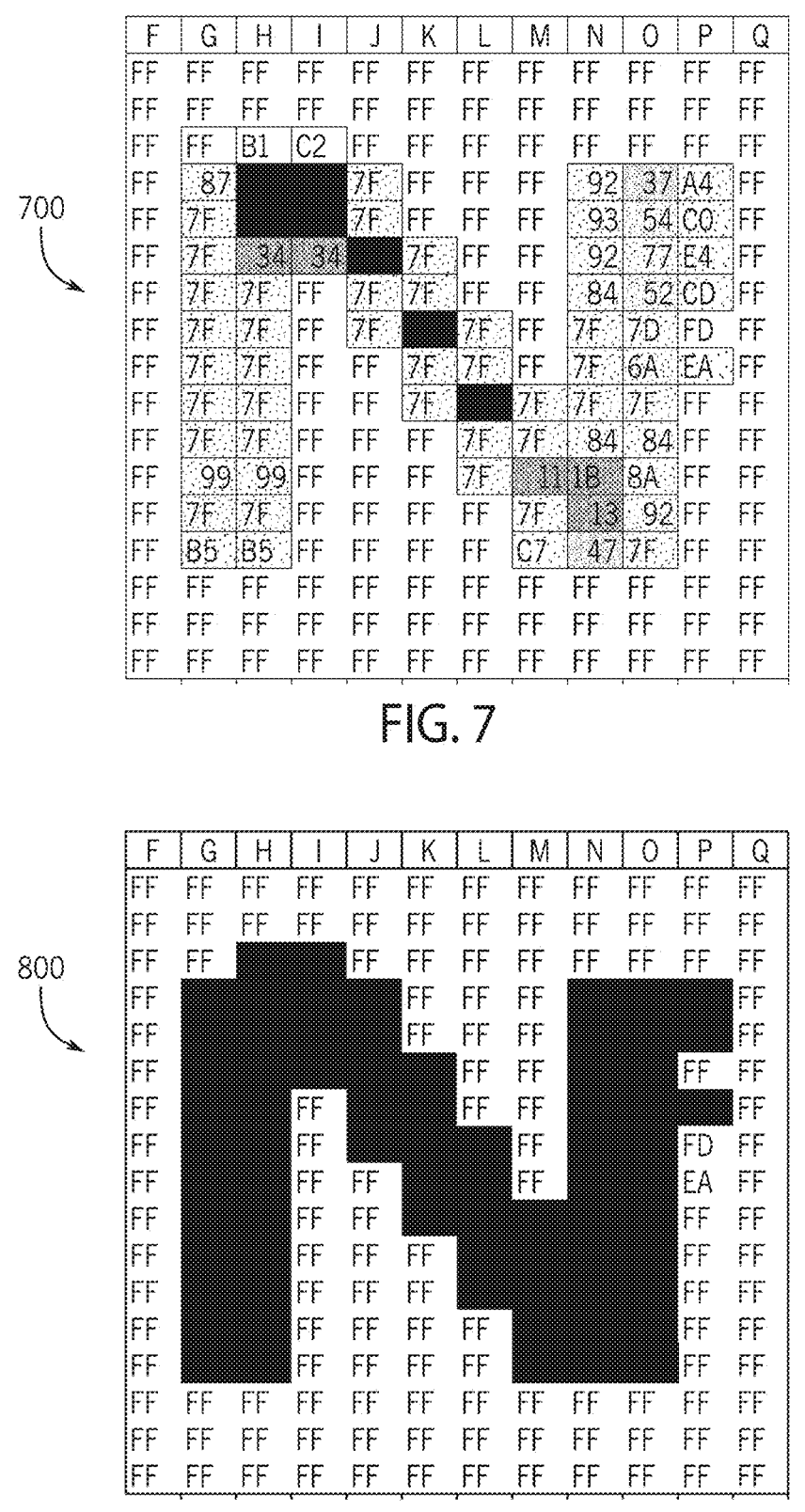

FIGS. 6-8 depict data associated with an alternative step of analyzing the date portion of the code, according to one exemplary embodiment. The date portion can include a date that corresponds with the best use date, a manufacturing date, an expiration date, a shipping date, an export date, a sale by date, another type of date, or combinations thereof. In some cases, the rows between the barcode section and the design section can be date section of the code.

In some examples, rows 60-77 contain the date section. In the example depicted in FIG. 2, the date section corresponds to a "Made on Date," which is ascertainable due to the letters that spell "MADE ON . . . " In different examples, other letters and/or characters can be used to convey information about the date and/or what date numbers represent.

Every pixel in the date section can be stored in a two dimensional character array. In some cases, the character array can be decoded to ensure the characters read "MADE ON" and to determine the date. The date section can be decoded from the two dimensional array. The array can be analyzed to determine that the words 'MADE ON' are the first two words in the array and to determine the date on which the pod was made. The array 600 can be analyzed letter by letter for the 'MADE ON' verification, and digit by digit for the date, as depicted in FIG. 6. To extract each individual letter/digit from the array, the average column values can be compared. In cases where there is a space between letters/digits, the average column value can be determined based on the location of this space and then to separate each letter/digit. FIG. 7 depicts an example of the color values recorded in an array 700 for the pixels relating to the letter "N" in the date section. The average column values of the array can be calculated, and any column with a value below average can be set to 0 (black), while any column with a value over the average value can be set to 255 (white) as depicted in the array 800 of FIG. 8. In other examples, the threshold value can be a different calculated threshold or a predetermined threshold for determining the color assignments. The spaces are then used to individualize the letters/digits.

In some cases, the calculated or predetermined threshold is dependent on characteristics outside of the code. For example, the pixel values can be affected by light exposure. A higher exposure can brighten the image, raising the average column values. If the exposure is too high, the value of an averaged column that would otherwise be under a value of 240 can go above 240 and cause false letter separation.

At least a portion of the decoding process can involve ensuring that the words "MADE ON" or other appropriate letters or symbols are contained in the array. After each letter is individually extracted from the array associated with the date section, the array can be examined to ensure that the date section includes the correct letters and also in the correct locations. The letters can be determined by comparing the vertical and horizontal transition counts to a set matrix.

Each digit in the date is decoded individually. The programmed instructions can analyze each segment of each digit individually in order to determine the value of the digit. The pixel values that make up the segment can be averaged to determine if the segment is white or black. In some cases, in response to determining at least some of the segments, the programmed instructions assign a number value to the digit.

Figure 9:
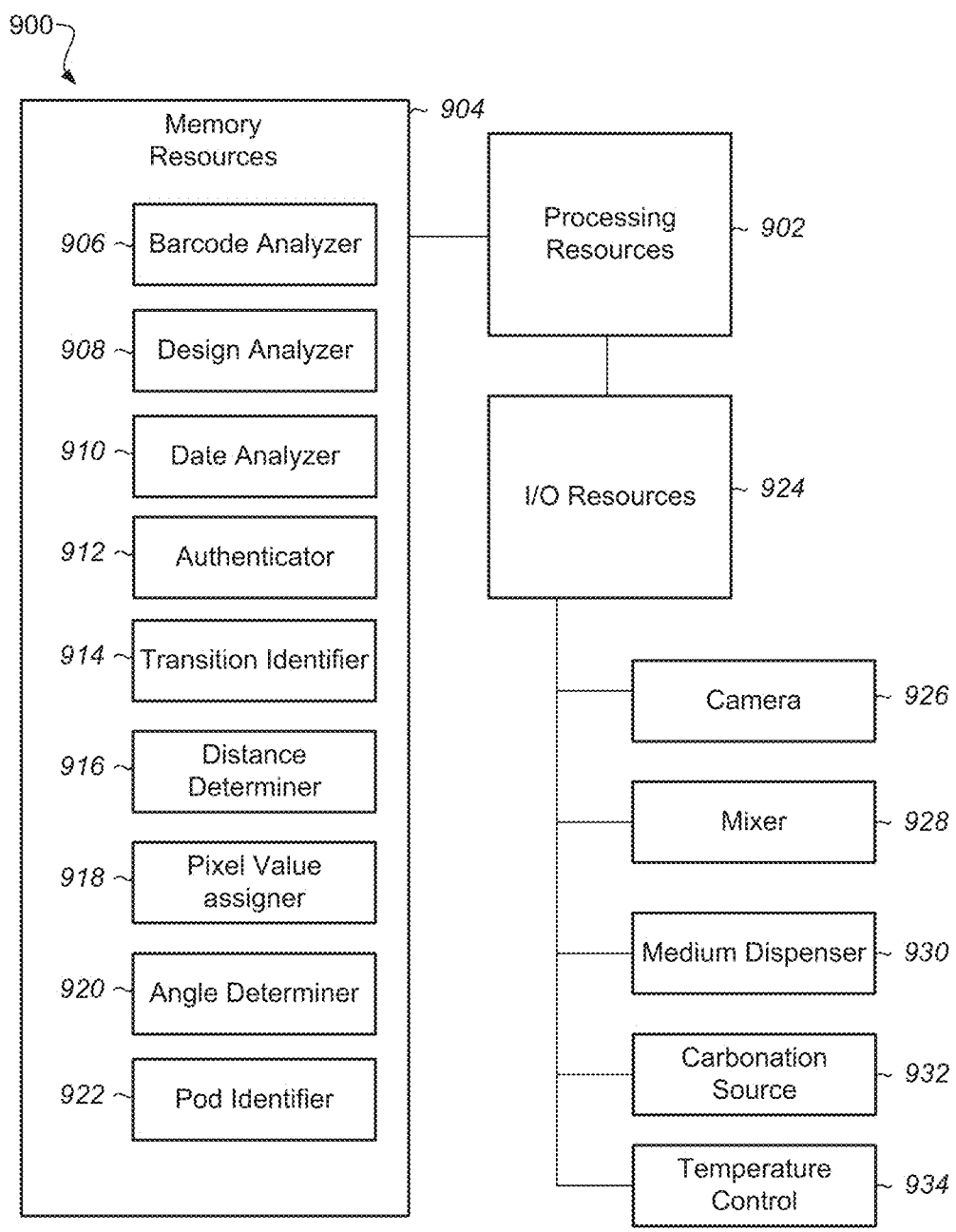
FIG. 9 depicts an example of an analysis system in accordance with aspects of the present disclosure.

FIG. 9 illustrates a perspective view of an example of an analysis system 900 in accordance with the present disclosure. The analysis system 900 can include a combination of hardware and programmed instructions for executing the functions of the analysis system 900. In this example, analysis system 900 includes processing resources 902 that are in communication with memory resources 904. Processing resources 902 include at least one processor and other resources used to process the programmed instructions. The memory resources 904 represent generally any memory capable of storing data such as programmed instructions or data structures used by the analysis system 900. The programmed instructions and data structures shown stored in the memory resources 904 include a barcode analyzer 906, a design analyzer 908, a date analyzer 910, an authenticator 912, a transition identifier 914, a distance determiner 916, a pixel value assigner 918, an angle determiner 920, and a pod identifier 922.

Input/output (I/O) resources 924 are in communication with the processing resources 902. The I/O resources 924 can include any appropriate type of mechanism for communicating with remote devices. For example, the I/O resources 924 can include a transmitter, a wireless transmitter, a receiver, a transceiver, a port for receiving an external memory, a network interface, another I/O resource, or combinations thereof.

The I/O resources 924 can be in communication with any appropriate device. In the illustrated example, the I/O resources 924 are in communication with a camera 926, a mixer 928, a medium dispenser 930, a carbonation source 932, a temperature control 934, or combinations thereof. These devices can be located in the appliance, can be independent of the appliance, can be in communication with the I/O resources 924 over a network, or combinations thereof.

The processing resources 902 can include one or more processors. The processing resources 902 can include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, the processing resources 902 can be configured to operate a memory array using a memory controller. In other cases, a memory controller can be integrated into the processor. The processing resources 902 can be configured to execute computer-readable instructions stored in a memory to perform various functions (e.g., function or tasks supporting overlaying exercise information on a remote display).

An I/O controller can manage input and output signals for the system and the appliance. Input/output control components can also manage peripherals not integrated into the system and/or appliance. In some cases, the input/output control component can represent a physical connection or port to an external peripheral. In some cases, I/O controller can utilize an operating system such as iOS®, ANDROID®, MS-DOS®, MS-WINDOWS®, OS/2®, UNIX®, LINUX®, or another known operating system.

Memory resources 904 can include random access memory (RAM) and read only memory (ROM). The memory can store computer-readable, computer-executable software including instructions that, when executed, cause the processor to perform various functions described herein. In some cases, the memory resources 904 can contain, among other things, a Basic Input-Output system (BIOS) which can control basic hardware and/or software operation such as the interaction with peripheral components or devices.

The barcode analyzer 906 represents programmed instructions that, when executed, cause the processor to analyze the barcode section of the code. In some examples, the barcode is an interleaved 2 or 5 barcode. The barcode analyzer 906 can be analyzed as described above. In other examples, the barcode analyzer 906 can use a different analysis approach than described above.

The design analyzer 908 represents programmed instructions that, when executed, cause the processor to analyze the design section of the code. In some examples, the design is used to authenticate the code and the pod. In other examples, the design can include additional types of information that are not contained in the barcode section. The design can be analyzed as described above or the design can be analyzed through a different approach.

The date analyzer 910, if used, represents programmed instructions that, when executed, cause the processor to analyze a date of the code. The date can be any appropriate date that is associated with an event of the pod, such as a manufacturing date, a shipping date, an export date, a best used by date, a best sold by date, an expiration date, another type of date, or combinations thereof. The date can be analyzed as described above or the date can be analyzed through a different approach.

The authenticator 912 represents programmed instructions that, when executed, cause the processor to authenticate the code. In some cases, the analysis of the design section of the code is used to authenticate the code. But, in alternative examples, other sections of the code can be used to authenticate the code. The authenticator 912 can use information derived from the transition identifier 914, distance determiner 916, the pixel value assigner 918, the angle determiner 920, another portion of the memory, a remote source, another device, or combinations thereof.

The transition identifier 914 represents programmed instructions that, when executed, cause the processor to identify the color transition between the pixels in a row. In some examples, the bars can have a color value of 0 (black) and the white gaps can have a color value of 255. The transition identifier 914 can identify where the colors change in the row of pixels. In some cases, to save memory save, the transition can be stored in the memory rather than storing each individual pixel value in the memory. This can allow for the use of a camera with less memory that can be less expensive than conventionally used cameras. As a result, the cost of the camera and the overall cost of the appliance can lowered. The transitions values can outline the boundaries of the circles, lines, squares, rectangles, triangles, polygons, asymmetric shapes, other shapes, other symbols, other characters, or combinations thereof in the design section.

The distance determiner 916 represents programmed instructions that, when executed, cause the processor to determine the distance between the boundaries in the design section of the code. In some cases the distance determiner 916 can determine the thickness of a line, the length of a line, the width of a circle, the size of a circle, any appropriate dimension of a shape in the design, or combinations thereof. In some cases, the distance determiner 916 can be used to determine the space between different objects in the design. For example, the distance determiner 916 can be used to determine the distance between the circles, between the lines, the distance between other types of objects, or combinations thereof. In some cases, authentication is only verified when the distances between objects match the desired distances and/or dimensions that are either calculated or predetermined.

The pixel value assigner 918 represents programmed instructions that, when executed, cause the processor to assign the pixel value. In some cases, the pixel values are obtained through the camera. In some examples, these pixel values can range from 0 to 255 in the greyscale. An average value, another calculated value, or a predetermined value can be used to determine whether the pixel value assigner 918 assigns a pixel to have either the full 255 value or the zero value. For example, all pixels that have an averaged value over a predetermined value of 240 can be assigned to have the 255 value or, in other words, are assigned to be white. In contrast, all values under the 240 threshold can be assigned to a value of zero, or in other words, assigned to be black. These colors assignments can be used by the transition identifier 914 to determine where the boundaries are in the different sections of the code.

The angle determiner 920 represents programmed instructions that, when executed, cause the processor to determine the angle of at least a portion of the design section of the code. For example, the boundaries identified with the color transitions can be used to determine a midpoint of line, and the angle of the midpoint can be used as the angle of the overall line. During the authentication process, at least one angle of a line or another feature can be have to be within a calculated or predetermined range to be authenticated.

The pod identifier 922 represents programmed instructions that, when executed, cause the processor to identify the pod. The barcode can include the identification of the pod. In some cases, the memory stores a table of the pod types and the identification of the pods within that type. In other cases, this table can be stored at a remote site, and the processor can case the I/O resources 904 to look-up the pod's identification number to determine the type of pod. With the identification of the pod, the appliance can obtain the procedure for preparing the specific beverage associated with the beverage medium in the pod. For example, the processing resources can send instructions to the mixer 928, the medium dispenser 930, the carbonation source 932, the temperature control 934, another device, or combinations thereof based on the identification of the pod.

Figure 10:
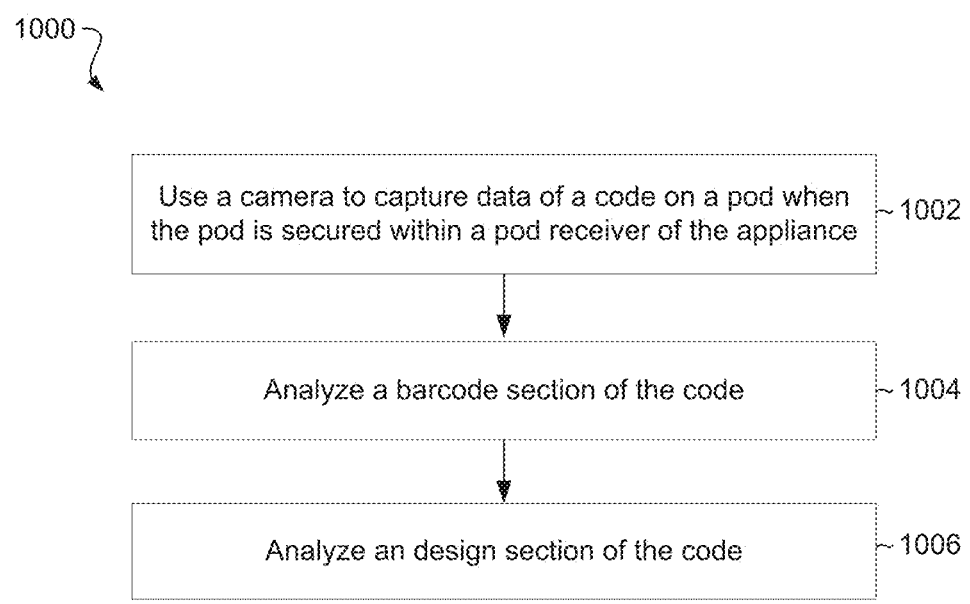
FIG. 10 depicts an example of a method using an appliance in accordance with aspects of the present disclosure.

FIG. 10 shows a flowchart illustrating a method 1000 of using an appliance to make a beverage. The operations of method 1000 can be implemented by the analysis system described in FIG. 9, the appliance, or its components as described herein. In some examples, the analysis system can execute a set of codes to control the functional elements of the device to perform the functions described below. Additionally or alternatively, the analysis system, the appliance, or other devices can perform aspects the functions described below using special-purpose hardware. In this example, the method 1000 includes using a camera to capture data of a code on a pod when the pod is secured within a pod receiver of an appliance 1002, analyzing a barcode section of the code 1004, and analyzing a design section of the code 1006.

At block 1002, an image of the code is captured with the camera when the pod is secured within the pod receiver of the appliance. In some examples, the pod is placed in the pod receiver so that the code affixed to the pod is viewable by the camera. In some cases, the pod is secured with an attachment mechanism in the pod receiver, and the attachment mechanism forces the pod to be oriented so that the code is facing the camera.

The camera can be a low cost camera that does not have the memory capability to store the entire code within its memory. In some cases, the data captured from the camera is sent to memory outside of the camera and associated with a processor of the appliance. This additional memory can also be insufficient to store the entire image of the code, but can be large enough to store a portion of the data that can be derived from the code. The smaller amount of memory can allow for lower cost camera and/or a lower cost appliance.

At block 1004, the barcode section of the code is analyzed. In some cases, the analysis of the barcode is used to determine an identification number of the pod. The pod's identification number can be used to identify the type of beverage medium contained within the pod and/or how to prepare a beverage using the beverage medium.

At block 1006, the design section of the code is analyzed. In some cases, the analysis of the design can be used to authenticate the pod and prevent against counterfeit parts or pods. In some cases, the design includes images that are not stored in the camera, such as storing a value for each pixel of the image. Rather, information derived from the design, such as color transition points or other types of information can be stored in the memory and used for further analysis.

Figure 11:
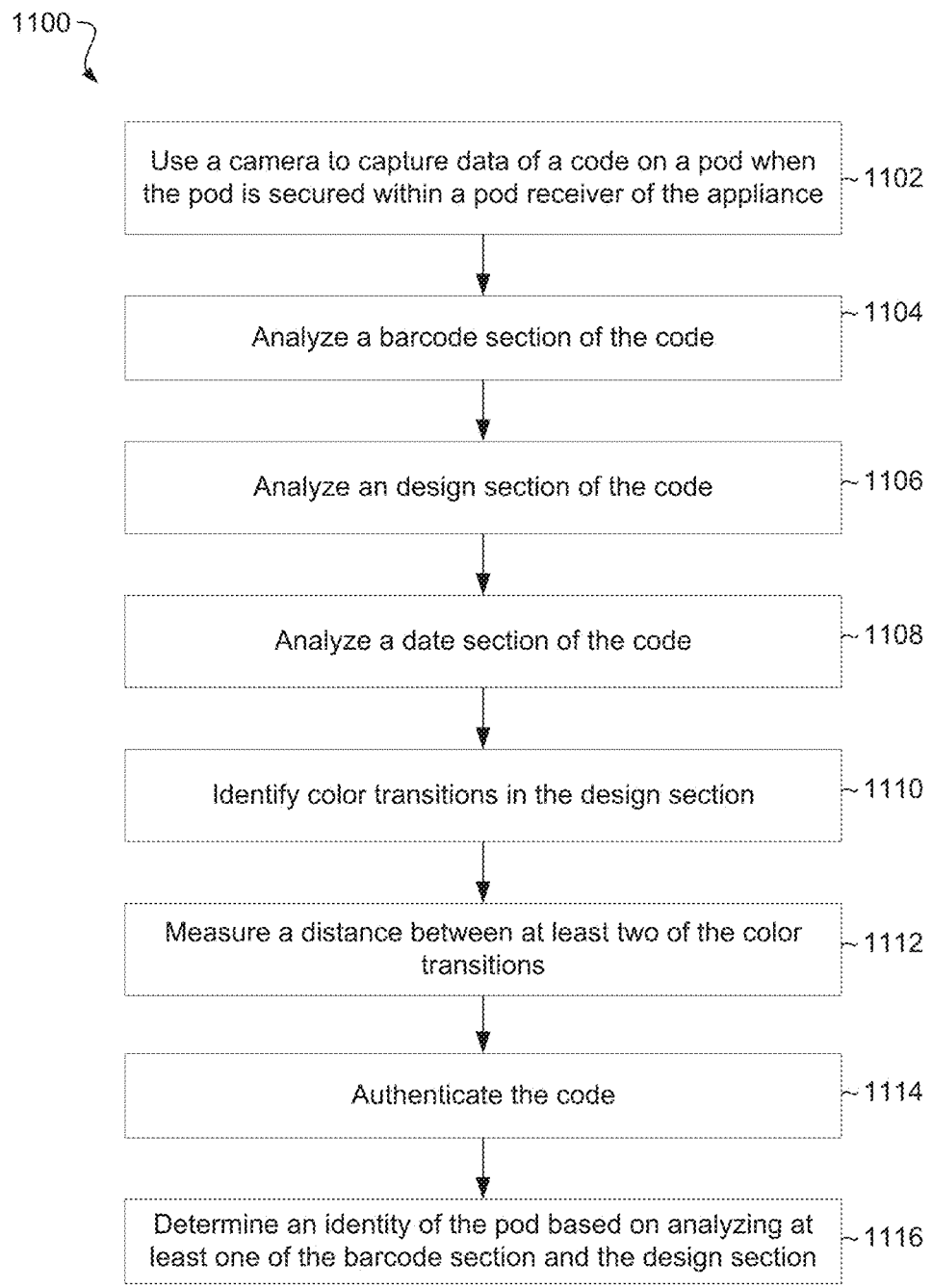
FIG. 11 depicts an example of using an appliance in accordance with aspects of the present disclosure.

FIG. 11 shows a flowchart illustrating a method 1100 of using an appliance to make a beverage. The operations of method 1100 can be implemented by the analysis system described in FIG. 9, the appliance, or its components as described herein. In some examples, the analysis system can execute a set of codes to control the functional elements of the device to perform the functions described below. Additionally or alternatively, the analysis system, the appliance, or other devices can perform aspects the functions described below using special-purpose hardware. In this example, the method 1100 includes using a camera to capture data of a code on a pod when the pod is secured within a pod receiver of an appliance 1102, analyzing a barcode section of the code 1104, analyzing a design section of the code 1006, analyzing a date section of the code 1108, identifying color transitions in the design section 1110, measuring a distance between at least two of the color transitions 1112, authenticating the code 1114, and determining an identity of the pod based on analyzing at least one of the barcode section and the design section 1116.

At block 1108, the date section of the code is analyzed. The date section, if used, can include information about the beverage medium such as when it expires or when it was shipped. In some cases, the date information assists with identifying the pod's identification number and/or with authentication. In some cases, if the date indicates that the pod's contents have passed a healthy time period for use, the appliance can take a responsive action. A non-exhaustive list of responsive actions that can be compatible with the present disclosure can include, but is not limited to, sending a warning to the user about the health concern, stopping the use of the pod, rejecting the pod, ejecting the pod, flashing a warning light, sending an electronic message to a device operated by the user, displaying a message on the appliance, generating an audible sound, broadcasting an audible message, another responsive action, or combinations thereof.

At block 1110, at least one color transitions in at least a portion of the code is identified. In some examples, the color transition locations form an outline of at least a portion of the code. Also, in some cases, the colors are in the greyscale.

At block 1112, the distance between at least two of the color transitions are measured. In some cases, the code is analyzed pixel by pixel in a row. In the examples given above, the design includes a series of circles and two lines. In those examples above, many of the rows include four transition points each including transitions that represent the left side of a circle, the right side of a circle, a left side of a line, and a right side of the line. By measuring the distance between the right and left sides of the circle, the width of the circle in that row is determined. Thus, the adjacent rows can have an increasing distance or a decreasing distance, which helps identify what portion of the circle a particular row is in. The row where the measured distances increase to and decrease from can be considered to be the widest row of the circle and therefore be at the diameter of the circle. The thickness of the lines can be determined by measuring the distance between the right side and the left side of the line.

At block 1114, the code is authenticated. The authentication process can include determining that features of the design or other portions of the code meet established criteria. A non-exhaustive list of criteria can be associated with having consistent line lengths, having consistent circle widths, having consistent line widths, having consistent circle spacing, having a predetermine or calculated line angle, having a predetermine or calculated circle width, having a predetermine or calculated line width or length, having specific color value, having another feature, or combinations thereof.

At block 1116, the identity of the pod is determined. This identity can be based on the analysis of the barcode, the analysis of the date, the analysis of the design, or combinations thereof.

While the examples above have been depicted with the barcode section, the date section, and the design section being arranged in a specific order, any specific order can be used to arrange the sections of the code. For example, the barcode section can be placed between the design section and the date section, the design section can be placed between the barcode section and the date section, or combinations thereof. In some examples, at least one of the barcode section, the design section, or the date section can be omitted from the code. Further, while the examples above have been described with specific sections being attributed to certain pixel rows, the different sections can be part of any appropriate group of pixel rows. Additionally, while the examples above have represented each of the code sections being a particular size relative to the other code section, any of the code sections can be different sizes with respect to the other sizes. For example, at least one of the sections can be enlarged or decreased without necessarily changing the sizes of the other code sections.

It should be noted that the methods described above describe possible implementations, and that the operations and the steps can be rearranged or otherwise modified and that other implementations are possible. Furthermore, aspects from two or more of the methods can be combined.

Information and signals described herein can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

The various illustrative blocks and modules described in connection with the disclosure herein can be implemented or performed with a general-purpose processor, a DSP, an ASIC, an FPGA or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices (e.g., a combination of a digital signal processor (DSP) and a microprocessor, multiple microprocessors, one or more microprocessors in conjunction with a DSP core, or any other such configuration).

The functions described herein can be implemented in hardware, software executed by a processor, firmware, or any combination thereof. If implemented in software executed by a processor, the functions can be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions can also be physically located at various positions, including being distributed so that portions of functions are implemented at different physical locations.

Computer-readable media includes both non-transitory computer storage media and communication media including any medium that facilitates transfer of a computer program from one place to another. A non-transitory storage medium can be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. In some cases, the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. A portable medium, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein can be applied to other variations without departing from the scope of the disclosure. Thus, the disclosure is not limited to the examples described herein, but is to be accorded the broadest scope consistent with the principles and novel features disclosed herein.

What is claimed is:

1. An appliance for making a beverage, comprising:
   a pod receiver;
   a camera oriented to capture a first resolution image of a code depicted on a pod in the pod receiver; and
   a processor and memory in communication with the processor, the processor including programmed instructions that cause the processor to:
   capture the first resolution image of the code depicted on the pod;
   create a reduced resolution image of a design section of the code, wherein each pixel of the first resolution image is downsized;
   analyze a barcode section of the code, wherein the analyzing of the barcode section comprises digital filtering of the first resolution image of the code with a median filter to remove noise from the first resolution image; and analyze the design section of the code, wherein the analyzing of the design section includes:
  identifying greyscale transition points in a plurality of rows of pixels of the reduced resolution image of the design section of the code, and
  storing the greyscale transition points in the memory without storing the pixels of the reduced resolution image between the greyscale transition points.

2. The appliance of claim 1, wherein the programmed instructions further cause the processor to analyze a date section of the code.

3. The appliance of claim 1, wherein the analyzing of the at least one of the barcode section and the design section involves storing bits of information about the code or the reduced resolution image of the code, without storing the first resolution image of the code in the memory.

4. The appliance of claim 1, wherein the barcode section is a binary barcode.

5. The appliance of claim 1, wherein the programmed instructions further cause the processor to authenticate at least a portion of the code.

6. The appliance of claim 5, wherein the authenticating at least a portion of the code includes comparing the portion of the code to a master template.

7. The appliance of claim 1, wherein the barcode section includes a plurality of black bars separated with a plurality of white gaps, wherein both the black bars and the white gaps provide data involved in decoding the code.

8. The appliance of claim 1, wherein the camera is a 640×480 pixel camera capable of operating at up to 30 frames per second.

9. The appliance of claim 1, wherein the pod includes a beverage medium and the code includes information on using the beverage medium.

10. An appliance for making a beverage, comprising:
  a pod receiver;
  a camera oriented to capture a first resolution image of a code depicted on a pod in the pod receiver, wherein the camera comprises a flash to illuminate the inside of the pod receiver to capture the first resolution image; and
  a processor and memory in communication with the processor, the processor including programmed instructions that cause the processor to:
    capture the first resolution image of the code depicted on the pod in response to closing a lid of the pod receiver;
    create a reduced resolution image of a design section of the code, wherein each pixel of the first resolution image is downsized;
    analyze the design section of the code; and
    authenticate the pod based on the analyzing of the design section of the code;
  wherein the authenticating of the pod includes:
    identifying color transitions of the design section of the code and an outline of at least a portion of the code,
    determining distances between boundaries in the design section of the code, and
    comparing the distances between the boundaries to desired distances in order to authenticate the pod.

11. The appliance of claim 10, wherein the analyzing of the design section of the code involves storing bits of information about the code or the reduced resolution image of the code, without storing the first resolution image of the code in the memory.

12. The appliance of claim 10, wherein the authenticating of the pod includes comparing at least a portion of the code to a master template.

13. The appliance of claim 10, wherein the programmed instructions further cause the processor to analyze a barcode section of the code.

14. An appliance for making a beverage, comprising:
  a pod receiver;
  a camera oriented to capture a first resolution image of a code depicted on a curved side of the pod in the pod receiver, wherein the pod and the pod receiver are fitted together in an orientation such that the code is always within a field of view of the camera; and
  a processor and memory in communication with the processor, the processor including programmed instructions that cause the processor to:
    capture the first resolution image of the code depicted on the pod in response to closing a lid of the pod receiver;
    create a reduced resolution image of a design section of the code, wherein each pixel of the first resolution image is downsized;
    analyze a barcode section of the code, wherein the analyzing of the barcode section comprises digital filtering of the reduced resolution image of the code with a median filter to remove noise from the reduced resolution image; and
    analyze a design section of the code,
  wherein the analyzing of the design section includes;
    identifying color transition points for one or more pixels of the reduced resolution image of the design section of the code, the color transition points outlining boundaries of shapes in the design section,
    determining distances between the boundaries, and
    authenticating the design section by comparing the determined distances to desired distances between the boundaries.

15. The appliance of claim 14, wherein the analyzing of the design section of the code further comprises:
  capturing row data for one or more rows of pixels of the first resolution image, and
  averaging the row data.

16. The appliance of claim 15, wherein the identifying of the color transition points comprises applying one or more filters to the average row data.

17. The appliance of claim 14, wherein the programmed instructions further cause the processor to analyze the pod based on the analyzing of the design section.

18. The appliance of claim 14, wherein the programmed instructions further cause the processor to analyze a date section of the code.

* * * * *